US012576938B2

(12) United States Patent
Casablancas

(10) Patent No.: US 12,576,938 B2
(45) Date of Patent: Mar. 17, 2026

(54) FOLDING BICYCLE AND METHOD OF USE

(71) Applicant: Julian Casablancas, Ridgefield, CT (US)

(72) Inventor: Julian Casablancas, Ridgefield, CT (US)

( * ) Notice: Subject to any disclaimer, the term of this patent is extended or adjusted under 35 U.S.C. 154(b) by 579 days.

(21) Appl. No.: 18/146,522

(22) Filed: Dec. 27, 2022

(65) Prior Publication Data

US 2023/0126291 A1 Apr. 27, 2023

Related U.S. Application Data

(63) Continuation of application No. 17/202,510, filed on Mar. 16, 2021, now Pat. No. 11,535,330, which is a continuation of application No. 15/907,255, filed on Feb. 27, 2018, now Pat. No. 10,946,924, which is a continuation of application No. 14/942,398, filed on Nov. 16, 2015, now Pat. No. 9,902,455, which is a continuation of application No. 14/444,249, filed on
(Continued)

(51) Int. Cl.
B62K 15/00 (2006.01)
B62K 11/10 (2006.01)
B62K 21/16 (2006.01)

(52) U.S. Cl.
CPC ............ B62K 15/008 (2013.01); B62K 11/10 (2013.01); B62K 21/16 (2013.01); *B62K 2015/001* (2013.01)

(58) Field of Classification Search
CPC ............................ B62K 11/10; B62K 2202/00
See application file for complete search history.

(56) References Cited

U.S. PATENT DOCUMENTS

D200,946 S    4/1965  Moulton
3,554,311 A   1/1971  Thompson
(Continued)

FOREIGN PATENT DOCUMENTS

CN    2143582 Y    10/1993
CN    2283606 Y    6/1998
(Continued)

OTHER PUBLICATIONS

PCT Written Opinion and International Search Report for PCT/US2013/032840, dated Jun. 19, 2013.

*Primary Examiner* — Kevin Hurley
(74) *Attorney, Agent, or Firm* — Ellenoff Grossman & Schole LLP

(57) ABSTRACT

A folding bicycle and method for folding the folding bicycle is provided. The folding bicycle comprises a frame having a first end and a second end; a first wheel connected to the second end of the frame, the first wheel and the frame being located in a first plane; a fork having a first end and a second end, the second end of the fork pivotally connected to the first end of the frame thereby allowing the fork to pivot about the first plane; a second wheel connected to the first end of the fork, the second wheel and the fork being located in a second plane; a first pivot member having a first pivot axis to allow the first end of the fork to pivot towards the second end of the fork about the first pivot axis; a second pivot member having a second pivot axis to allow the first end of the frame to pivot towards the second end of the frame about the second pivot axis; and a third pivot member having a third pivot axis to allow the second end of the frame to pivot towards the first end of the frame about the third pivot axis.

15 Claims, 19 Drawing Sheets

Related U.S. Application Data

Jul. 28, 2014, now Pat. No. 9,187,145, which is a continuation of application No. 13/622,890, filed on Sep. 19, 2012, now Pat. No. 8,789,840.

(56)                    References Cited

U.S. PATENT DOCUMENTS

| | | | |
|---|---|---|---|
| 3,979,136 | A | 9/1976 | Lassiere |
| 4,023,436 | A | 5/1977 | Dodge |
| 4,030,562 | A | 6/1977 | Leighton |
| 4,044,851 | A | 8/1977 | Shaw |
| 4,072,204 | A | 2/1978 | Leighton |
| 4,296,940 | A | 10/1981 | Herbert |
| 4,410,060 | A | 10/1983 | Cunard |
| 4,440,414 | A | 4/1984 | Wang |
| D291,873 | S | 9/1987 | Koyama |
| 4,786,070 | A | 11/1988 | Adee |
| 5,052,706 | A | 10/1991 | Tsai |
| D330,354 | S | 10/1992 | Ogden |
| 5,492,033 | A | 2/1996 | Hopey |
| 5,816,355 | A | 10/1998 | Battlogg |
| 5,934,401 | A | 8/1999 | Mayer |
| 6,011,366 | A | 1/2000 | Murakami |
| 6,270,103 | B1 | 8/2001 | Grimm |
| 6,595,539 | B1 | 7/2003 | Belli |
| 6,623,021 | B1 | 9/2003 | Nelson |
| 6,702,312 | B1 | 3/2004 | Miksik |
| 6,802,385 | B2 | 10/2004 | Pyntikov |
| 6,883,817 | B2 | 4/2005 | Chu |
| 6,886,845 | B2 | 5/2005 | Chao |
| 7,055,842 | B1 | 6/2006 | Lin |
| 7,150,339 | B2 | 12/2006 | Liao |
| 7,306,249 | B2 | 12/2007 | Kwok |
| 7,341,268 | B2 | 3/2008 | Lin |
| 7,367,576 | B2 | 5/2008 | Pan |
| 7,451,848 | B2 | 11/2008 | Flowers |
| 7,490,842 | B1 | 2/2009 | Ulrich |
| D619,050 | S | 7/2010 | Tolhurst |
| 7,779,948 | B2 | 8/2010 | Gulas |
| 7,951,049 | B2 | 5/2011 | Mondelle |
| D650,724 | S | 12/2011 | Chiang |
| 8,123,243 | B2 | 2/2012 | Ho |
| 8,167,074 | B1 | 5/2012 | Tsiyoni |
| D668,586 | S | 10/2012 | Golias |
| 8,342,546 | B2 | 1/2013 | Bryant |
| 8,348,294 | B1 | 1/2013 | Moldestad |
| 8,439,385 | B2 | 5/2013 | Baroa |
| 8,696,007 | B2 | 4/2014 | Jankura |
| 8,789,840 | B2 | 7/2014 | Priest |
| 8,801,009 | B2 | 8/2014 | Sapir |
| 9,051,021 | B2 | 6/2015 | Bettin |
| D735,620 | S | 8/2015 | Pape |
| 9,457,864 | B2 | 10/2016 | Bailie |
| 9,475,539 | B2 | 10/2016 | Ehrhard |
| 10,173,745 | B1 | 1/2019 | Oravecz |
| 10,266,225 | B2 | 4/2019 | Henderson |
| D900,681 | S | 11/2020 | Liu |
| 2004/0056452 | A1 | 3/2004 | Mihelic |
| 2005/0001404 | A1 | 1/2005 | Mihelic |
| 2005/0062256 | A1 | 3/2005 | Chen |
| 2005/0116441 | A1 | 6/2005 | Chang |
| 2005/0285366 | A1 | 12/2005 | Huang |
| 2006/0070785 | A1 | 4/2006 | Ducharme |
| 2006/0175797 | A1 | 8/2006 | Sanders |
| 2007/0024023 | A1 | 2/2007 | Hsu |
| 2007/0096424 | A1 | 5/2007 | Chen |
| 2008/0061529 | A1 | 3/2008 | Schmautz |
| 2008/0116659 | A1 | 5/2008 | Seaman |
| 2009/0095552 | A1 | 4/2009 | Gulas |
| 2010/0066055 | A1 | 3/2010 | Laxstrom |
| 2010/0096827 | A1 | 4/2010 | Tsai |
| 2010/0133777 | A1 | 6/2010 | Daniels |
| 2010/0212978 | A1 | 8/2010 | Huang |
| 2010/0230927 | A1 | 9/2010 | Huang |
| 2011/0025016 | A1 | 2/2011 | Waaijer |
| 2013/0228389 | A1 | 9/2013 | Nakashima |
| 2013/0270792 | A1 | 10/2013 | Park |

FOREIGN PATENT DOCUMENTS

| | | | |
|---|---|---|---|
| CN | 2316218 | Y | 4/1999 |
| CN | 201023593 | Y | 2/2008 |
| CN | 201062077 | Y | 5/2008 |
| CN | 201472567 | U | 5/2010 |
| CN | 201721568 | U | 1/2011 |
| CN | 202147799 | U | 2/2012 |
| CN | 102753424 | B | 7/2014 |
| DE | 102010010172 | A1 | 9/2011 |
| DE | 102013205120 | A1 | 9/2013 |
| IT | M120110272 | A1 | 8/2012 |
| JP | 08198167 | A | 8/1996 |
| KR | 10-2011-0035279 | A | 4/2011 |
| KR | 101143613 | B1 | 5/2012 |
| KR | 20120098286 | A | 9/2012 |
| WO | 8303232 | A1 | 9/1983 |
| WO | 0216194 | A1 | 2/2002 |
| WO | 2011134309 | A1 | 11/2011 |
| WO | 2012016899 | A1 | 2/2012 |
| WO | WO-2014154295 | A1 | 10/2014 |

Start 400

Raise steering member away from fork 402

506  508

Rotate steering member 404

530  534

Fold steering member into cavity, fold footrest unit against frame, and fold upper seat portion against lower seat portion 406

702  618  706  610  606  704

A

FOLDING BICYCLE AND METHOD OF USE

REFERENCE TO RELATED APPLICATIONS

This application is a continuation application of Non-Provisional application Ser. No. 17/202,510, filed Mar. 16, 2021, which is a continuation of Non-Provisional application Ser. No. 15/907,255, filed Feb. 27, 2018, which is a continuation of Non-Provisional application Ser. No. 14/942,398, filed Nov. 16, 2015, which is a continuation of Non-Provisional application Ser. No. 14/444,249, filed Jul. 28, 2014, which is a continuation of Non-Provisional application Ser. No. 13/622,890, filed Sep. 19, 2012, and issued as U.S. Pat. No. 8,789,840 on Jul. 29, 2014, the entire contents of the entire chain of applications is herein incorporated by reference.

FIELD OF THE INVENTION

This invention relates generally to the field of bicycles, and, more particularly, to a novel and improved folding bicycle and method of use. Notably, the application of this invention extends to, but is not limited to, electric bicycles, gas bicycles and manual bicycles.

BACKGROUND OF THE INVENTION

Often times the distance one must travel is seemingly too short or too inconvenient to ride a bus or subway or to drive a car, but too long to walk. These circumstances present opportune times to ride a bicycle. Moreover, people living in large, mid-sized, or even small metropolitan areas often find it more convenient to travel around the city by bicycle, which provides an efficient mode of transportation in such crowded areas. Accordingly, in today's crowded urbanized areas, it is desirable to use a bicycle for traveling short to medium distances. A bicycle provides personal transportation, can carry small loads, is easy and convenient to maneuver and park in crowded places, and is low in cost to purchase and maintain. Automobiles consume large amounts of fossil fuels, create pollution, are a safety hazard, and are costly to maintain and park. Motorcycles have all of the problems of automobiles (though perhaps to a lesser degree) but present a greater safety hazard when operating at high speeds. It is also beneficial to use a bicycle as a means of transportation in crowded cities as it alleviates, among other things, the need to locate parking for a car, pay for parking a car, and abide by the schedule and inconvenience of public transportation.

Although riding a bicycle for transportation can alleviate the above drawbacks, bicycles typically are bulky and inconvenient for portability and storage. This inconvenience of portability and storage often results in bicycles being left outside, leaving them susceptible to theft. To make even greater use of bicycles beyond just point-to-point transport, it would be desirable to have a bicycle that could be quickly folded so that it can be transported inside the trunk of a car or as baggage on a train or airplane; so that it could be used locally at a remote destination. Foldable bicycles have an advantage of a relatively compact arrangement for storage and/or transport, making them popular with users wishing to reduce storage space, such as commuters, recreation enthusiasts, and campers, among others. However, known folding bicycles have myriad shortcomings. For example, in general, the large size of the folding bicycles of the prior art prohibit the storage of these folding bicycles within a closet, or a small area and make it difficult to easily and conveniently fit them into a suitcase or carrying-bag for transporting. Moreover, many of the known folding bicycles do not provide all of the qualities of being low in cost, easy and simple to fold into a small volume such as a suitcase, and sturdy and reliable to use. Many other folding bicycles necessitate the removal of one or both wheels, which is an inconvenient and complex procedure. Some folding bicycles that have sturdy folding frame parts are very expensive and/or utilize heavy metal parts that increase the overall weight. Others that are less costly have folding parts that are not as sturdy, do not fold easily or well, or are excessively heavy.

In some conventional or manual folding bicycles, folding joints are situated in the central area of the frame, such as within one or more of the down tube, top tube, seat tube and head tube, or bearing tube. A disadvantage of such an arrangement is that the bicycle's ability to fold into a compact volume is dramatically reduced. A further disadvantage is that known folding bicycles have frames that frequently are smaller than the frames of a comparable standard non-folding bicycle. This reduces the ergonomic suitability for a rider. A result of this for many riders is a decrease in the distance that can be ridden with comfort.

Current folding bicycles typically have pedals, thus requiring the user to exert a substantial amount of energy to ride. Exerting the amount of energy necessary to ride a bicycle often results in the user sweating upon arrival at his or her destination. Because riding a bicycle causes the rider to sweat, the user often must dress down and change into appropriate clothing upon arriving at his or her destination. This is yet another drawback of current folding bicycles.

Electric bicycles are becoming increasingly popular throughout the world. However, it is laborious for a bicycle rider to carry a folded electric bicycle because electric bicycles are generally heavier than typical bicycles due to the additional weight of the electric motor, battery pack, and associated components. Moreover, due to the bulky design, electric motor, battery pack, and associated components, it is difficult to fold current electric bicycles to a compact and portable size. Thus, the need for improvement still exists.

There is therefore a need for a folding bicycle and method of use that overcomes some or all of the previously delineated drawbacks of prior folding bicycles.

SUMMARY OF THE INVENTION

The present invention includes a folding bicycle and method of use that is preferably ergonomically comfortable when riding, preferably can be readily folded into a compact arrangement, preferably can be battery powered, gas powered, manually powered, preferably can be provided without the traditional drive chain mechanism and pedals of manually powered bicycles, preferably can be easily transported and stored, and/or preferably can maintain its structural rigidity and integrity despite repeated folding and unfolding.

The present invention includes a folding bicycle and method of use. The folding bicycle is preferably used as a means for transportation. Moreover, the folding bicycle is preferably battery powered, however, it should be appreciated that the present invention can be implemented with electrical or battery powered bicycles, gas powered bicycles, and standard, manually powered bicycles, without limiting the scope of the present invention. While the present invention will be described below with respect to a battery powered folding bicycle, it should be appreciated that any type of bicycle, including but not limited to the types of bicycles just indicated, may be incorporated with the present invention, without limiting the scope of the present invention.

In a first non-limiting aspect of the invention, a folding bicycle is provided. The folding bicycle preferably comprises: (i) a frame having a first end and an opposing second end; (ii) a rear wheel rotatably connected to the second end of the frame, the rear wheel and frame being located in a first plane; (iii) a fork having a first end and an opposing second end, the second end of the fork pivotally connected to the first end of the frame, wherein the fork is adapted to pivot about the first plane, thereby allowing a rider to steer the bicycle; (iv) a front wheel rotatably connected to the first end of the fork, the front wheel and fork being located in a second plane; (v) a first primary pivot member or hinge having a first pivot axis to allow the first end of the fork to pivot towards the second end of the fork; (vi) a second primary pivot member or hinge having a second pivot axis to allow the first end of the frame to pivot towards the second end of the frame; and (vii) a third primary pivot member or hinge having a third pivot axis to allow the second end of the frame to pivot towards the first end of the frame.

It is also contemplated that the folding bicycle of the invention preferably comprises: (i) a steering unit having a coupling member or an elbow-shaped member comprising a first end rotatably coupled to a steering member or handlebar, via a first secondary pivot member or swivel mount, and an opposing second end pivotally coupled to the second end of the fork, via a second secondary pivot member or axle; (ii) a footrest unit having an elongated member comprising a first end preferably pivotally coupled to the underside of the frame, via a third secondary pivot member or hinge, and an opposing second end, whereby a flange extends generally perpendicularly from the second end of the elongated member; and (iii) a seat unit or saddle having an upper seat portion pivotally connected to a lower seat portion, via a fourth secondary pivot member or hinge.

As previously stated, it is contemplated that the folding bicycle be battery powered. As such, the folding bicycle of the invention and its method of use may be utilized for transportation while limiting the manual effort required to be expended by the rider or user of the folding bicycle. The folding bicycle of the invention is also preferably designed to fold or collapse into a compact arrangement, thereby allowing a user to easily transport and store the bicycle. This is preferably done by providing the three primary pivot members or hinges described above, the secondary pivot members or hinges described above, and a battery to power the bicycle, and by eliminating from the bicycle design the traditional chain drive mechanism and pedals employed by most manually powered bicycles. For example, the implementation of the three primary folds, the three secondary folds, and a battery, and the elimination of the traditional chain drive mechanism and pedals from the bicycle design allow a rider and/or owner of the bicycle to fold the bicycle into an extremely compact arrangement for easy transport and storage.

It is contemplated that the folding bicycle provides a means for conveniently and practically commuting and for conveniently and safely stowing and transporting the bicycle. The implementation of a battery-powered bicycle allows the rider to ride the bicycle while avoiding breaking a sweat. Thus, it is further contemplated that the folding bicycle of the present invention may used as transportation, where the rider is able to wear the desired attire for the destination rather than require the rider to first wear appropriate attire for riding the bicycle and then change into appropriate attire upon arrival at his or her destination. It is further contemplated that the folding bicycle of the present invention may be folded or collapsed into a small enough size fit for safe and convenient storage and/or transportation inside appropriate areas, such as, but not limited to hallways, corridors, passageways, alleys, stairwells, foyers, elevators, closets, storage rooms, offices, and the like, within office buildings, residential apartments, homes, restaurants, shopping centers, etc. Allowing the user of the bicycle to store the folded bicycle inside prevents the bicycle from being left outside with the possibility of it being stolen and allows it to be easily recharged once brought inside. It is further contemplated that the folding bicycle may be folded into a compact or appropriate size fit for being stored and/or transported in a small bag.

In a second non-limiting aspect of the invention, a folding bicycle is provided. The folding bicycle comprises a front frame section and a rear frame section. The front frame section has a first member including a first wheel, a second member, and a first pivot member pivotally connecting the first member and the second member along a first axis, the first pivot member having a first pivot axis substantially perpendicular to the first axis to allow the first member to pivot towards the second member until the first member is substantially parallel to the second member. The rear frame section has a third member connected to the front frame section, a fourth member, a fifth member including a second wheel, and a second pivot member pivotally connecting the third member and the fourth member along a second axis, the second pivot member having a second pivot axis substantially perpendicular to the second axis to allow the third member to pivot towards fourth member until the third member is substantially parallel to the fourth member. The rear frame section also has a third pivot member pivotally connecting the fourth member and the fifth member along the second axis, the third pivot member having a third pivot axis substantially perpendicular to the second axis to allow the fifth member to pivot towards fourth member until the fifth member is substantially parallel to the fourth member.

In a third non-limiting aspect of the invention, a method for folding a bicycle is provided. The method preferably comprises the steps of folding a first end of a fork of the bicycle connected to a first wheel about a first pivot axis towards a second end of the fork until the first end is substantially parallel to the second end; folding a first end of a frame of the bicycle pivotally connected to the fork about a second pivot axis towards a second end of the frame until the first end of the frame is substantially parallel to the frame; and folding the second end of the frame connected to a second wheel about a third pivot axis towards the first end of the frame until the second wheel is substantially parallel to the first wheel.

The method preferably further comprises pivoting a steering member connected to the second end of the fork about a fourth pivot axis away from the fork; rotating the steering member about a fifth pivot axis until the steering member is substantially parallel to the fork; and folding the steering member about the fourth pivot axis at least partially within a cavity of the fork. The method further comprises folding a footrest unit about a sixth pivot axis towards the frame and folding an upper seat portion of a seat unit about a seventh pivot axis towards a lower seat portion of the seat unit.

BRIEF DESCRIPTION OF THE DRAWINGS

A further understanding of the invention can be obtained by reference to a preferred embodiment set forth in the illustrations of the accompanying drawings. Although the illustrated embodiment is merely exemplary of systems and methods for carrying out the invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the invention, reference is now made to the following drawings in which.

DETAILED DESCRIPTION OF THE INVENTION

The invention may be understood more readily by reference to the following detailed description of preferred embodiment of the invention. However, techniques, systems and operating structures in accordance with the invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the invention. It must be noted that, as used in the specification and the appended claims, the singular forms "a", "an", and "the" include plural referents unless the context clearly indicates otherwise.

Figure 1A:
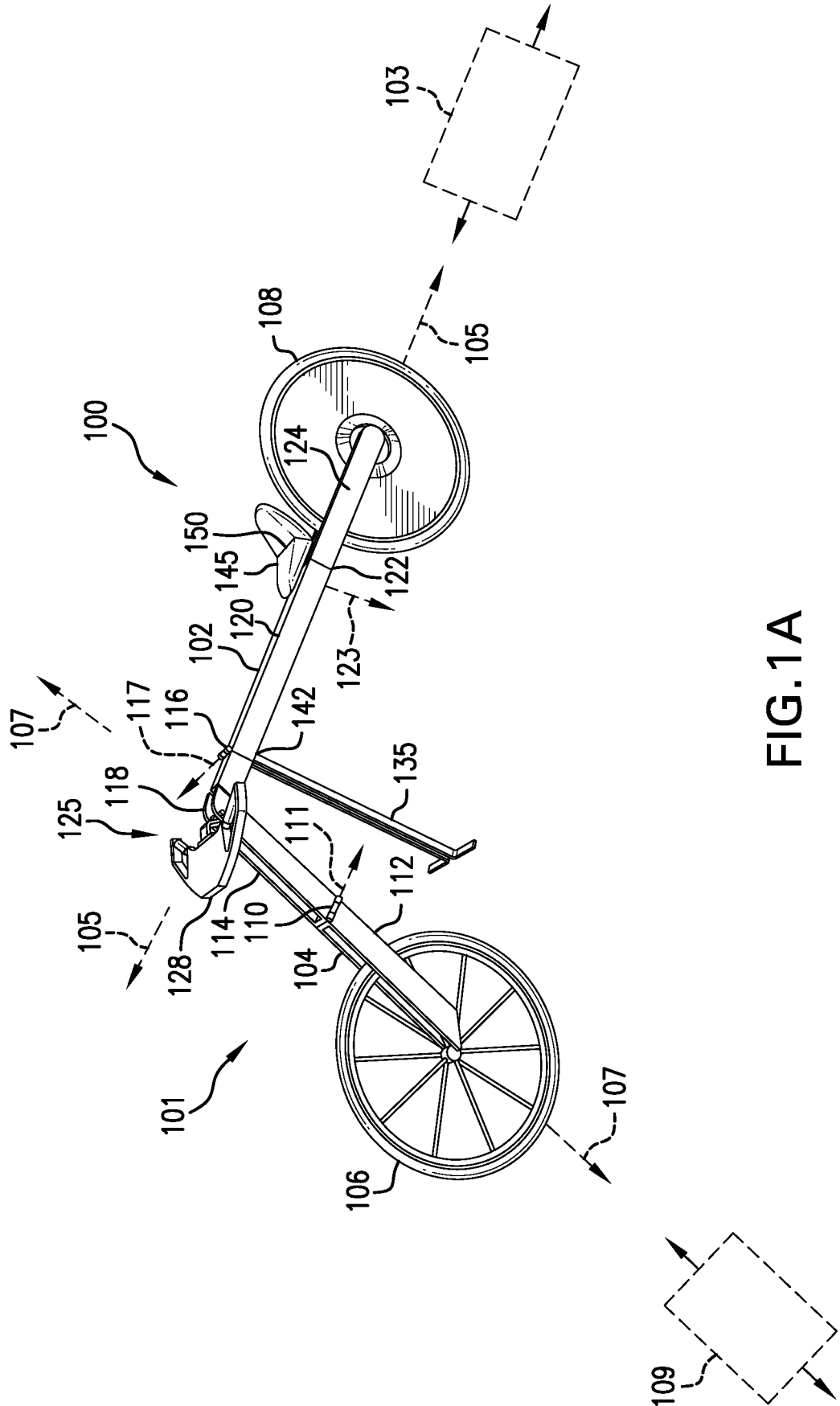
FIG. 1A illustrates a left side view of a folding bicycle in a riding configuration according to an embodiment of the invention.

Referring now to the figures, wherein like numerals indicate like elements throughout, FIG. 1A illustrates an embodiment of folding bicycle 100 in a riding configuration 101. As shown in FIG. 1A, folding bicycle 100 comprises a frame 102 and a rear wheel 108 rotatably connected to frame 102. As further shown in FIG. 1A, frame 102 may extend only longitudinally along a first axis. Rear wheel 108 and frame 102 are located in a first plane 103. Folding bicycle 100 also comprises a fork 104, whereby fork 104 is pivotally connected to frame 102, via a steering column or headset 141 (best shown in FIG. 1C), and a front wheel 106 rotatably connected to fork 104. Front wheel 106 and fork 104 are located in a second plane 109. As further shown in FIG. 1A, rear wheel 108 may be connected to frame 102 at a first height, and fork 104 may be connected to frame 102 at a second height which is higher than the first height. Also, the angle between frame 102 and fork 104 may be approximately 90 degrees.

Folding bicycle 100 also comprises first, second, and third primary pivot members 110, 116 and 122. First primary pivot member or hinge 110 preferably has a pivot axis 111 substantially parallel to plane 109. First primary pivot member 110 pivotally connects a first end 112 of fork 104 to a second end 114 of fork 104 along an axis 107 of fork 104. Pivot axis 111 is substantially perpendicular to axis 107 of fork 104. Second primary pivot member or hinge 116 has a pivot axis 117 substantially perpendicular to plane 103. Second primary pivot member 116 pivotally connects a first end 118 of frame 102 to a middle portion 120 of frame 102 along an axis 105 of frame 102. Pivot axis 117 is substantially perpendicular to axis 105 of frame 102. Third primary pivot member or hinge 122 has a pivot axis 123 substantially parallel to plane 103. Third primary pivot member 122 pivotally connects a second end 124 of frame 102 to middle portion 120 of frame 102 along axis 105 of frame 102. Pivot axis 123 is substantially perpendicular to axis 105 of frame 102.

Furthermore, folding bicycle 100 comprises a steering unit 125 having a coupling member or elbow-shaped member 126 (best shown in FIG. 1B) and a steering member or handlebar 128. Handlebar 128 is pivotally connected to fork 104 by coupling member 126. Folding bicycle 100 also comprises a footrest unit 135 pivotally connected to frame 102 by a secondary pivot member or hinge 142. Finally, folding bicycle 100 comprises a seat unit or saddle 145 connected to frame 102 to allow a rider to sit on folding bicycle 100. Saddle 145 comprises a secondary pivot member or hinge 150 to allow saddle 145 to fold.

Figure 1B:
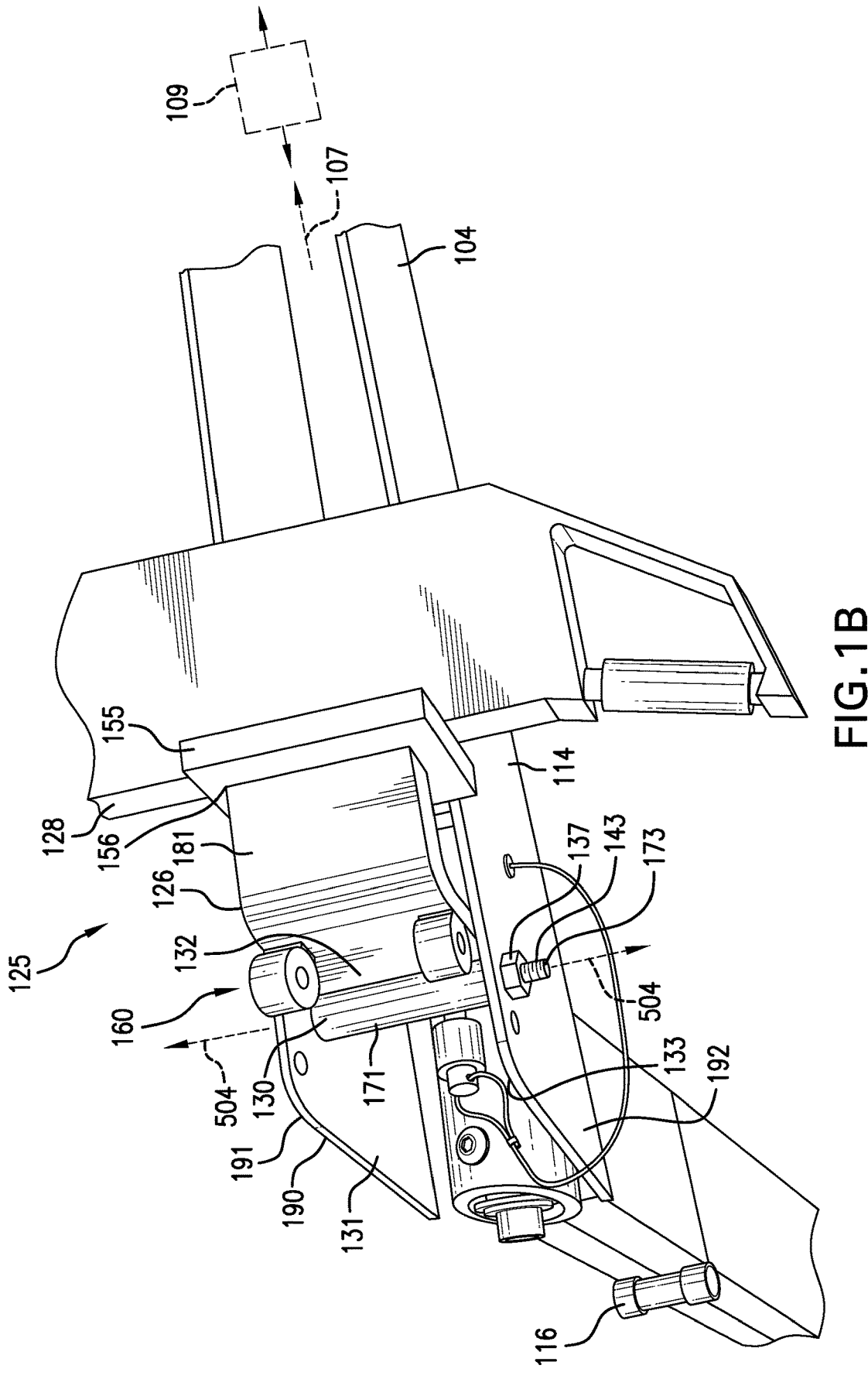
FIG. 1B illustrates a perspective view of the steering unit of the folding bicycle of FIG. 1A according to an embodiment of the invention.

As shown in detail in FIG. 1B, folding bicycle 100 comprises a steering unit 125 having a coupling member or elbow-shaped member 126 pivotally coupled to fork 104, and a steering member or handlebar 128 rotatably coupled to coupling member 126. Steering unit 125 further comprises a plate 155 molded or welded to a first end 156 of coupling member 126, a secondary pivot member or swivel mount 550 (best shown in FIG. 1E) rotatably connecting steering member or handlebar 128 to plate 155, a secondary pivot member or axle 130 pivotally connecting a second end 132 of coupling member 126 to second end 114 of fork 104, and a locking mechanism 160 coupled to second end 132 of coupling member 126.

Moreover, as shown in FIG. 1B, secondary pivot member or axle 130 comprises a hollow cylindrical member 171 that extends between internal surfaces 131 and 133 of fork 104 and a nut 137 coupled to a bolt 143. Hollow cylindrical member 171 comprises a bore (not shown) adapted to receive bolt 143. The bore (not shown) extends internally through the entire length of hollow cylindrical member 171. Bolt 143 resides within the bore (not shown). Hollow cylindrical member 171 is preferably molded or welded to external surface 181 of coupling member 126 near second end 132 of coupling member 126. Bolt 143 comprises a head portion 560 (best show in FIG. 5B) at a first end and a threaded portion 173 at an opposed second end. Nut 137 preferably comprises threads (not shown) adapted to grip threaded portion 173 of bolt 143. Nut 137 and bolt 143 may be any type of nut and bolt combination commonly known and used in the art, without departing from the spirit of the present invention.

Axle 130 is created by sliding bolt 143 through an aperture 570 (best shown in FIG. 1D) provided on sidewall 190 of fork 104 and through hollow cylindrical member 171 until head portion 560 (FIG. 5B) of bolt 143 abuts external surface 191 of fork 104 and threaded portion 173 of bolt 143 protrudes through an aperture 572 (best shown in FIG. 1D) provided on sidewall 192 of fork 104. Nut 137 is then coupled to threaded portion 173 of bolt 143 to secure bolt 143 in place. Axle 130 has a pivot axis 504. Pivot axis 504 is perpendicular to axis 107 and plane 109 of fork 104. Axle 130 serves to pivotally connect coupling member 126 to fork 104 and thereby allows coupling member 126, and therefore handlebar 128, to pivot about pivot axis 504 when locking mechanism 160 is in the unlocked position.

Figure 1C:
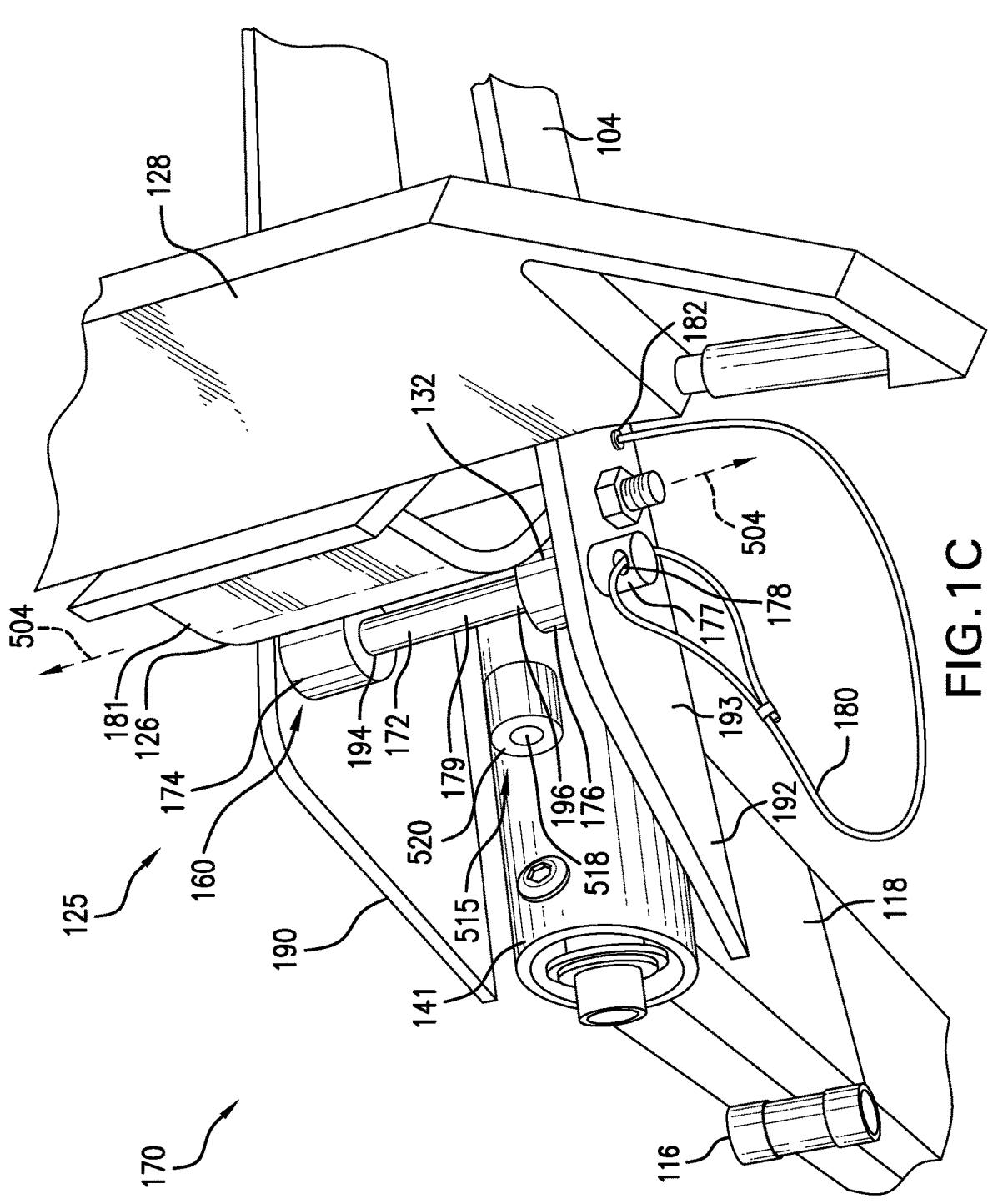
FIG. 1C illustrates a perspective view of the steering unit of the folding bicycle of FIG. 1A in the riding configuration according to an embodiment of the invention.

Turning now to FIG. 1C, steering unit 125 is depicted in a locked position 170 suitable for riding configuration 101. In this position, coupling member 126, and therefore handlebar 128, are prevented from rotating about pivot axis 504. Locking mechanism 160 comprises two donut-shaped members 174 and 176 and a locking pin 172. Donut-shaped members 174 and 176 are cylindrical in shape and each contains a bore 194 and 196, respectively, extending from end to end. Furthermore, donut-shaped members 174 and 176 are preferably molded or welded to external surface 181 of coupling member 126, near second end 132 of coupling member 126, and are adapted to fit within the sidewalls of fork 104. Locking pin 172 comprises a cylindrical head portion 177 and a cylindrical rod portion 179 extending laterally from head portion 177. Cylindrical rod portion 179 generally has a length longer than the width of fork 104 so that it may extend entirely through fork 104 in order to lock steering unit 125 in place. Additionally, the diameter of cylindrical head portion 177 is generally larger than the diameter of cylindrical rod portion 179 to prevent cylindrical head portion 177 from entering aperture 535 (best shown in FIG. 1D) with the result that it may abut external surface 193 of fork 104 when it is in place. Cylindrical head portion 177 comprises an aperture 178 adapted to receive a retaining wire 180. Retaining wire 180 is provided to retain locking pin 172 to folding bicycle 100 by securely coupling retaining wire 180 to fork 104. Locking pin 172 is coupled to folding bicycle 100 by first sliding a first end of retaining wire 180 through aperture 178 of cylindrical head portion 177 and subsequently coupling the first end of retaining wire 180 to another portion of retaining wire 180, then sliding a second end of retaining wire 180 through an aperture 182 provided on fork 104, and finally creating a loop or knot (not shown) on the second end of retaining wire 180 to prevent that end from sliding back through aperture 182 of fork 104.

Figure 1D:
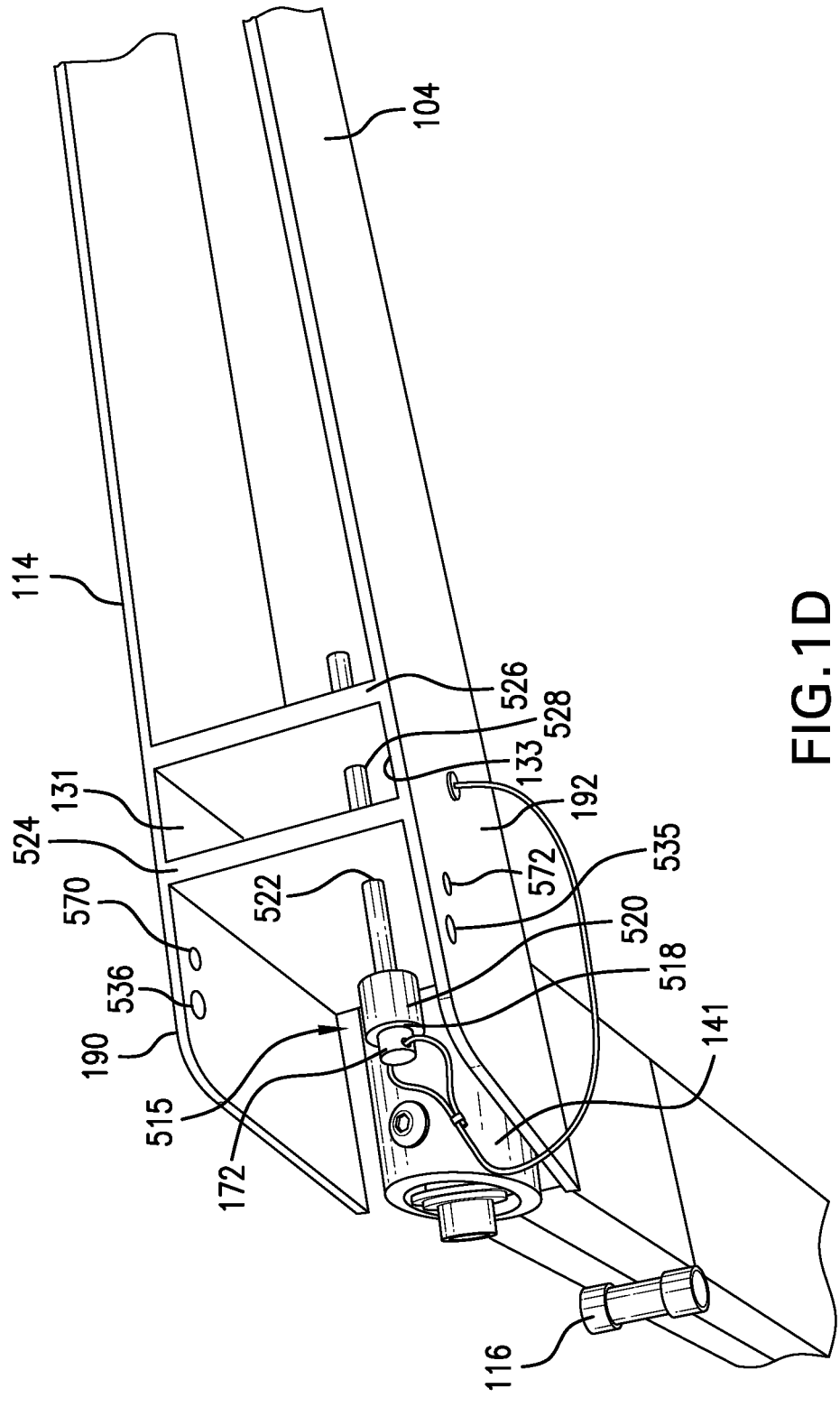
FIG. 1D illustrates a perspective view of the folding bicycle of FIG. 1A with the steering unit removed to depict the fork locking mechanism according to an embodiment of the invention.

To place steering unit 125 in locked position 170, first, handlebar 128 must be rotated about pivot axis 504 until bore 194 of donut-shaped member 174 is aligned with an aperture 536 (best shown in FIG. 1D) provided on sidewall 190 of fork 104 and bore 196 of donut-shaped member 176 is aligned with an aperture 535 (best shown in FIG. 1D) provided on sidewall 192 of fork 104; then, cylindrical rod portion 179 of locking pin 172 is slid through aperture 535 (FIG. 1D) provided on sidewall 192, through bore 196 of donut-shaped member 176, through bore 194 of donut-shaped member 174 and finally through aperture 536 (FIG. 1D) provided on sidewall 190 of fork 104 until cylindrical rod portion 179 protrudes through aperture 536 (FIG. 1D). Furthermore, locking pin 172 is preferably slid from sidewall 192 of fork 104 to sidewall 190 of fork 104 until the bottom surface of cylindrical head portion 177 of locking pin 172 abuts external surface 193 of fork 104, as shown in FIG. 1C. Once locking pin 172 is in place, as just described, handlebar 128 is prevented from rotating about pivot axis 504 and steering unit 125 is in locked position 170. It should be appreciated that, when in the position shown in FIG. 1C, locking pin 172 serves to keep handlebar 128 stable and at the appropriate level to allow a rider or user of folding bicycle 100 to easily and comfortably ride folding bicycle 100.

FIGS. 1C and 1D also depict a fork locking mechanism 515. More specifically, FIG. 1D illustrates a perspective view of the folding bicycle of FIG. 1A with steering unit 125 removed so as to enable fork locking mechanism 515 to be seen more readily. As shown in FIGS. 1C and 1D, folding bicycle 100 preferably comprises a fork locking mechanism 515 adapted to lock fork 104 to steering column 141, thereby preventing fork 104 from being able to pivot about steering column 141 when in the locked position. By preventing fork 104 from pivoting about steering column 141, folding bicycle 100 becomes more stable, thus making it easier to control and subsequently fold folding bicycle 100. Fork locking mechanism 515 comprises a donut-shaped member 520 connected to steering column 141. Donut-shaped member 520 is preferably molded or welded to steering column 141; however, it should be understood and appreciated that donut-shaped member 520 may be connected to steering column 141 by any known means or method without departing from the spirit of the invention. Moreover, donut-shaped member 520 comprises a bore 518 that extends completely through the body of donut-shaped member 520, as shown in FIGS. 1C and 1D. Fork locking mechanism 515 also comprises two plates 524 and 526 both of which extend between internal surfaces 131 and 133 of fork 104 near the top of fork 104. Specifically, plates 524 and 526 are located near the top of second end 114 of fork 104, in close proximity to where fork 104 pivotally couples to steering column 141 of frame 102. As shown in FIG. 1D, plate 524 comprises an aperture 522 that extends completely through plate 524, and plate 526 comprises an aperture 528 that extends completely through plate 526. Fork locking mechanism 515 is placed into the locked position by preferably sliding locking pin 172 through bore 518 of donut-shaped member 520, into aperture 522 of plate 524, and into aperture 528 of plate 526, as shown in FIG. 1D. Once locking pin 172 is in place, as just described, fork 104 is prevented from rotating about steering column 141 of frame 102.

In operation, when a rider or user of folding bicycle 100 desires to fold folding bicycle 100, it is preferred that the user first unlock locking mechanism 160 and then lock fork locking mechanism 515. Starting from the riding configuration, locking mechanism 160 is unlocked by removing locking pin 172 from fork 104, thereby releasing secondary pivot member 130 from its locked position and subsequently allowing handlebar 128 to pivot about pivot axis 504. After locking mechanism 160 is unlocked, as just described, fork locking mechanism 515 is locked using locking pin 172, in the manner described above, to prevent fork 104 from rotating about steering column 141, thereby allowing a user to more easily fold folding bicycle 100.

Figure 1E:
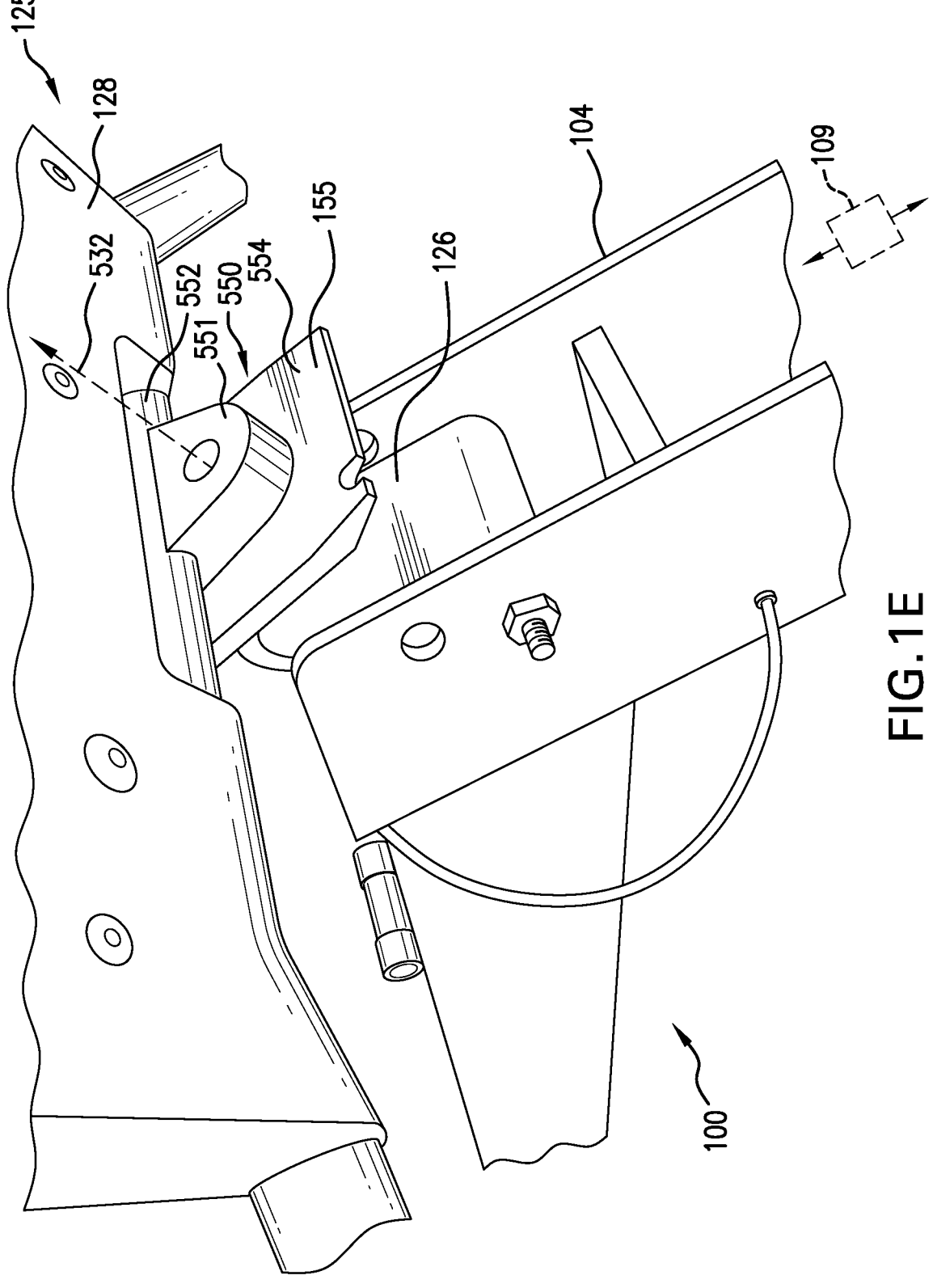
FIG. 1E illustrates a perspective view of the underside of the steering unit of the folding bicycle of FIG. 1A according to an embodiment of the invention.

FIG. 1E depicts the underside of steering unit 125 of folding bicycle 100 of FIG. 1A according to an embodiment of the invention. As shown, steering unit 125 preferably comprises a secondary pivot member or swivel mount 550 adapted to pivotally or rotatably connect steering member or handlebar 128 to coupling member 126. Secondary pivot member 550 preferably comprises a swivel member 551 that allows steering member 128 to rotate or swivel about coupling member 126. Swivel member 551 is molded or welded to the underside 552 of steering member 128. More specifically, one of the exterior surfaces of swivel member 551 is preferably molded or welded to underside 552 of steering member 128, as shown in FIG. 1E. Swivel member 551 is also preferably rotatably coupled to an exterior surface 554 of plate 155, thereby allowing steering member 128 to rotate or swivel relative to coupling member 126. It should be understood and appreciated that while a particular swivel mount 550 has been depicted and described, any type of swivel member or device commonly known or used in the art may be used to couple steering member 128 to coupling member 126, so as to allow steering member 128 to rotate relative to coupling member 126, without departing from the separate of the invention.

Figure 5B:
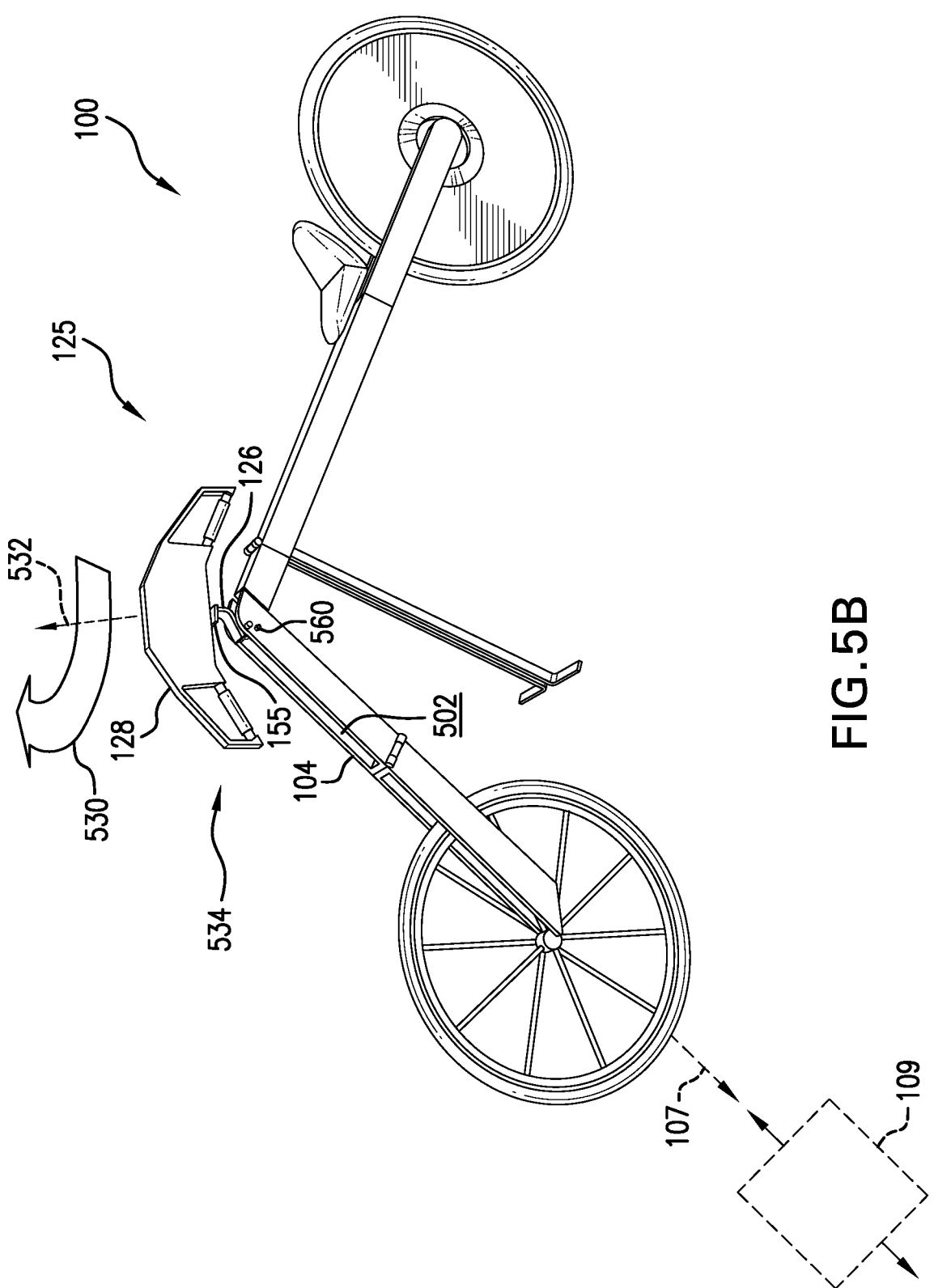
FIG. 5B illustrates a left side view of the folding bicycle of FIG. 1A with the steering unit in a second folded position according to an embodiment of the invention.
Figure 6:
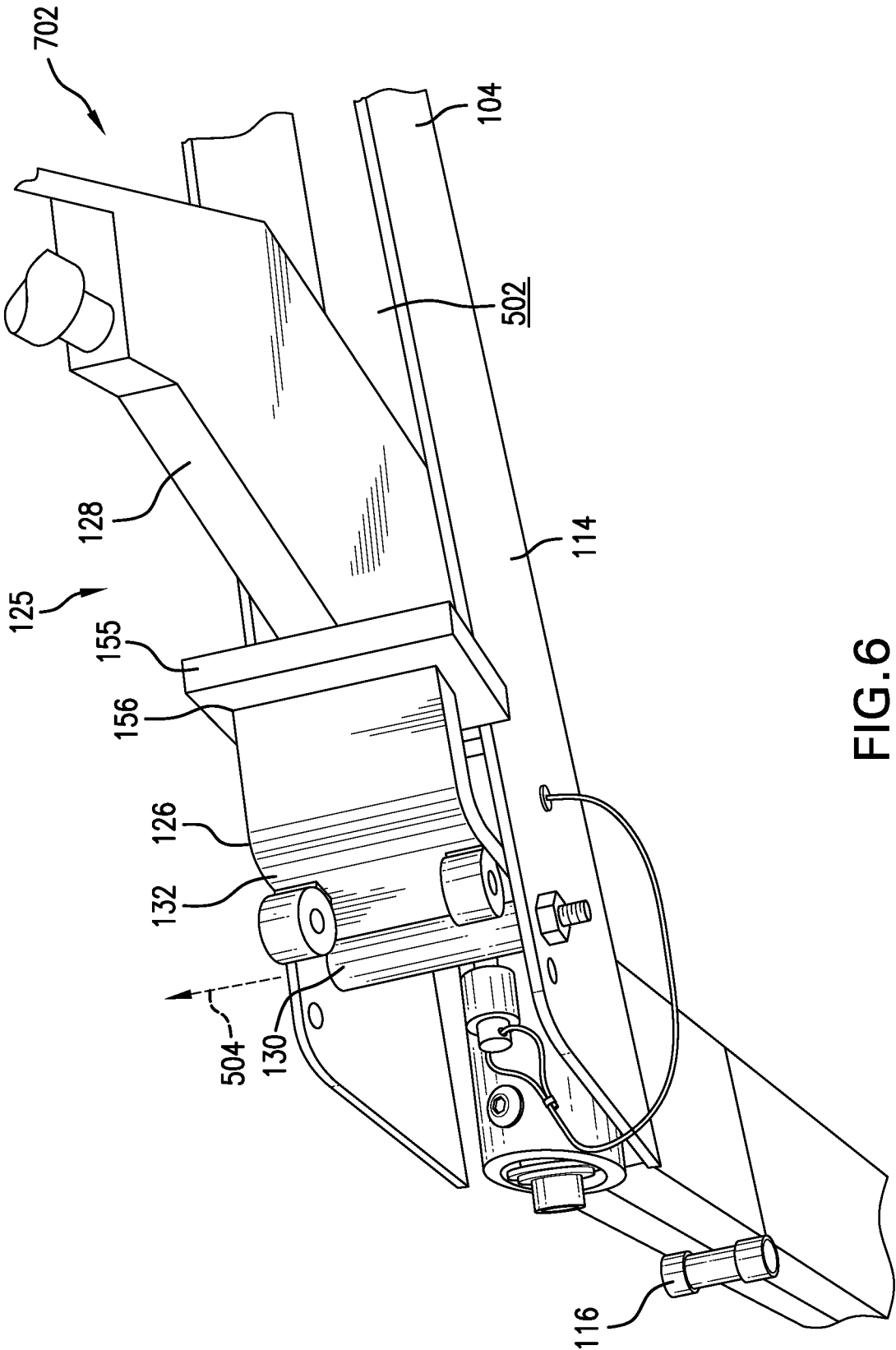
FIG. 6 illustrates a perspective view of the folding bicycle of FIG. 1A with the steering unit in a third folded position according to an embodiment of the invention.

Moreover, secondary pivot member or swivel mount 550 preferably has a pivot axis 532 that is substantially parallel to plane 109 of fork 104 and substantially perpendicular to plate 155 of coupling member 126. Secondary pivot member 550 allows steering member 128 to pivot or rotate about pivot axis 532, after secondary pivot member 550 is released from its locked position. Secondary pivot member 550 preferably allows steering member 128 to pivot or rotate in a direction 530 about pivot axis 532 in order for steering member 128 to align substantially parallel with fork 104 and align with cavity 502, as shown in FIGS. 5B and 6, to form folded configuration 534 (FIG. 5B). It should be understood and appreciated that steering member 128 may be any type of handlebar or handlebars commonly known or used in the art, which a rider of folding bicycle 100 may use to steer folding bicycle 100, without limiting the scope of the invention.

Figure 1F:
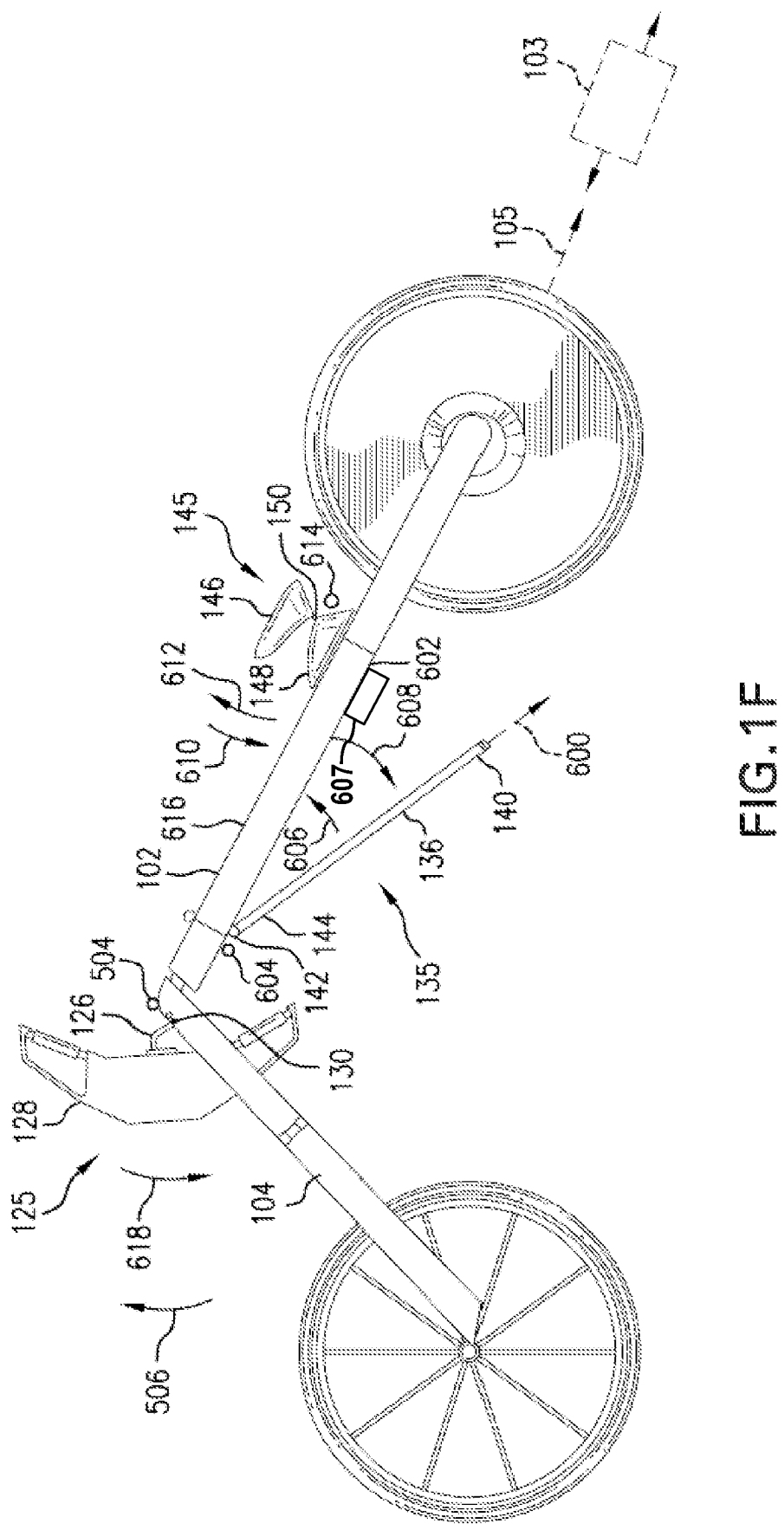
FIG. 1F illustrates a left side view of the folding bicycle of FIG. 1A depicting a steering unit, a footrest unit, and a seat unit of the folding bicycle of FIG. 1A according to an embodiment of the invention.

Referring now to FIG. 1F, steering unit 125, footrest unit 135, and seat unit 145 of folding bicycle 100 are illustrated. As shown in FIG. 1F, steering member 128 is adapted to pivot about pivot axis 504 in a direction 618 towards fork 104 and in a direction 506 away from fork 104, via secondary pivot member 130.

Footrest unit 135 comprises an elongated member 136 pivotally connected to frame 102. Footrest unit 135 also comprises a flange or footrest member 138 (best shown in FIG. 5A) preferably connected to elongated member 136 and a secondary pivot member or hinge 142 pivotally connecting elongated member 136 to frame 102. Moreover, footrest unit 135 is adapted to allow a rider of folding bicycle 100 to rest his or her feet when folding bicycle 100 is in riding configuration 101 and is adapted to be pivoted, via secondary pivot member 142, in directions 606 and 608 towards and away from, respectively, frame 102. For example, to fold footrest unit 135 for storage, after secondary pivot member or hinge 142 has been released from its locked position, elongated member 136 is pivoted in direction 606 toward frame 102 until elongated member 136 abuts the underside 602 of frame 102. A retaining member or clip 607 (schematically shown) may be provided on underside 602 of frame 102 to retain footrest unit 135 to frame 102.

As illustrated in FIG. 1F, elongated member 136 extends along an axis 600 and has a first end 144 and a second end 140. Secondary pivot member or hinge 142 is adapted to pivotally connect first end 144 of elongated member 136 to frame 102 and footrest member 138 (best shown in FIG. 5A) is preferably connected to second end 140 of elongated member. Moreover, secondary pivot member 142 comprises a pivot axis 604 substantially perpendicular to plane 103 and axis 105 and substantially perpendicular to axis 600 of elongated member 136 that allows elongated member 136 to pivot about pivot axis 604 after secondary pivot member 142 is released from its locked position. In particular, secondary pivot member 142 is adapted to allow elongated member 136 to pivot about pivot axis 604 in a direction 606 towards frame 102 and in a direction 608 away from frame 102.

Figure 5A:
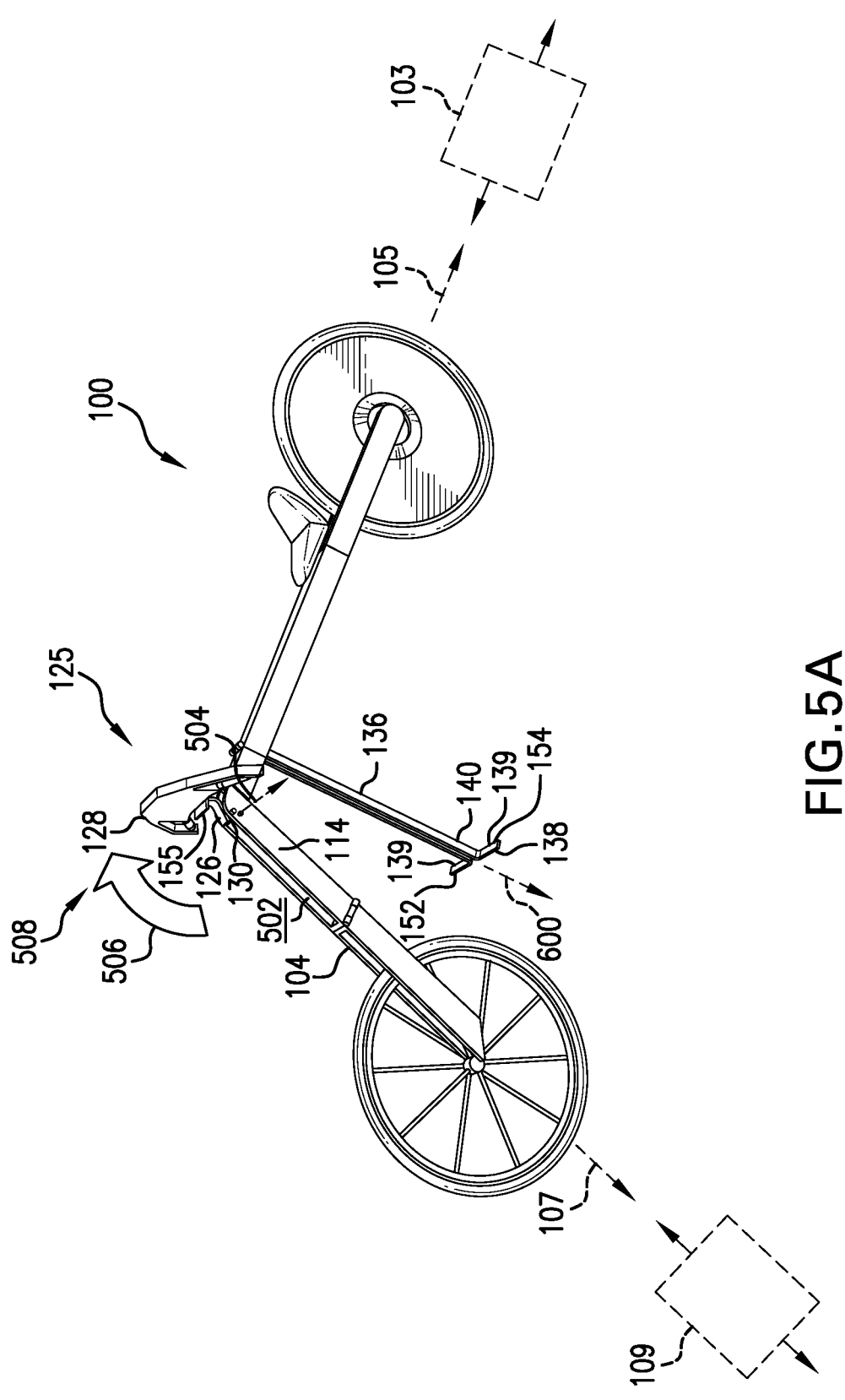
FIG. 5A illustrates a left side view of the folding bicycle of FIG. 1A with the steering unit in a first folded position according to an embodiment of the invention.

Briefly turning to FIG. 5A, footrest unit 135 also preferably comprises flange 138 comprising two members 152 and 154 extending substantially perpendicular from elongated member 136. Members 152 and 154 are preferably flat and are provided to allow a rider to rest his or her feet on the top surface 139 of members 152 and 154 while the rider is riding folding bicycle 100. While not shown in the figures, it is further contemplated that two pivot members or hinges may be may adapted to pivotally connect members 152 and 154 to elongated member 136. Each pivot member preferably comprises a pivot axis substantially parallel with plane 103 and perpendicular with axis 600 to allow members 152 and 154 of flange 138 to fold or pivot about their respective pivot axis towards elongated member 136 until each member 152 and 154 is substantially parallel to axis 600 and away from elongated member 136 until each member 152 and 154 is substantially perpendicular to elongated member 136.

Referring back to FIG. 1F, folding bicycle 100 also comprises a seat unit or saddle 145 connected to frame 102. Seat unit 145 preferably comprises an upper seat portion or upright, rear portion 146, a lower seat portion or base 148, and a secondary pivot member or hinge 150 pivotally connecting upper seat portion 146 to lower seat portion 148. Seat unit 145 is preferably connected or mounted to frame 102 by connecting lower seat portion 148 to the topside 616 of frame 102. Lower seat portion 148 may be connected or mounted to frame 102 via any method known in the art for connecting a bicycle saddle to a frame, including but not limited to, the use of a nut and bolt, screws, and the like.

Seat unit 145 is preferably adapted to allow a rider of folding bicycle 100 to sit when folding bicycle 100 is in riding configuration 101 and adapted to be pivoted, via secondary pivot member 150, in directions 610 and 612 towards and away from, respectively, frame 102. For example, to fold seat unit 145 for storage, after secondary pivot member or hinge 150 has been released from its locked position, upper seat portion 146 is preferably pivoted in direction 610 toward frame 102 until upper seat portion 146 abuts lower seat portion 148. While not shown, it is contemplated that a retaining member, clip, strap, or the like may be provided to retain upper seat portion 146 to lower seat portion 148. Moreover, lower seat portion 148 is preferably connected to topside 616 of frame 102 by any commonly known means and method.

Specifically, as illustrated in FIG. 1F, seat unit 145 preferably comprises a secondary pivot member or hinge 150 adapted to pivotally connect upper seat portion 146 to lower seat portion 148. Moreover, secondary pivot member 150 preferably comprises a pivot axis 614 substantially perpendicular to plane 103 and axis 105 to allow upper seat portion 146 to pivot about pivot axis 614 relative to lower seat portion 148 after secondary pivot member 150 is released from its locked position. In particular, secondary pivot member 150 is adapted to allow upper seat portion 146 to pivot about pivot axis 614 in a direction 610 towards frame 102 and in a direction 612 away from frame 102.

As shown in FIGS. 1A and 1B, folding bicycle 100 comprises several components implemented by traditional, manually powered bicycles. For example, folding bicycle 100 comprises steering unit 125, steering column or headset 141, fork 104, frame 102, and wheels 106 and 108. It should be understood and appreciated that one skilled in the art would know how to pivotally mount fork 104 comprising any type of traditional handlebar to steering column or headset 141 of frame 102, thereby allowing a rider to steer folding bicycle 100. It should also be understood and appreciated that (i) steering column or headset 141 may be coupled to frame 102 by any method or implementation commonly known in the art, particularly by being threaded, bolted, or welded to first end 118 of frame 102; (ii) fork 104 may be coupled to steering column or headset 141 by any method or implementation commonly known in the art to allow fork 104 to pivot about frame 102; and (iii) steering column or head set 141 operates in a similar manner as any steering column or headset commonly known or used in the art, without departing from the spirit of the present invention and without limiting the scope of the present invention. Additionally, it should be understood and appreciated that steering column or headset 141 may be any steering column or headset commonly known or used in the art, without departing from the spirit of the present invention. Moreover, any known method and implementation and any known components for pivotally mounting steering unit 125 to folding bicycle 100 may be employed, without limiting the scope of the present invention. Furthermore, it should be understood that one skilled in the art would also know how to rotatably mount wheels 106 and 108 to folding bicycle 100. Accordingly, any known method or implementation of any known components for mounting wheels 106 and 108 to folding bicycle 100 may be employed, without limiting the scope of the present invention.

Moreover, while not shown, it is contemplated that folding bicycle 100 is preferably powered by a drive mechanism comprising an electric throttle (not shown) provided on steering unit 125 and powered by a rechargeable battery (not shown) housed under seat unit 145. It is further contemplated that the drive mechanism, which is powered by the rechargeable battery (not shown), drives rear wheel 108 to propel folding bicycle 100, via a motor (not shown), preferably housed in a rear wheel axle drum (not shown) and connected to rear wheel 108. It should be understood that one skilled in the art would know how to implement any commonly known or used drive mechanism with folding bicycle 100 in order to propel folding bicycle 100. Accordingly, any known method and implementation of any known components for utilizing a commonly known or used drive mechanism to power an electric bicycle may be employed, without limiting the scope of the present invention.

It should also be understood that while folding bicycle 100 is in the riding configuration 101, as illustrated in FIG. 1A, all pivot members or hinges implemented by folding bicycle 100 are in a locked position to prevent the hinges from folding and to maintain the rigid structure of folding bicycle 100. Moreover, while not shown in the figures, it is contemplated that any locking mechanism commonly known or used in the art, such as a hole or interlocking teeth with a mating pin inserted therethrough, mating snap or clasp members, and the like, may be implemented to maintain each of the hinges in a locked position when folding bicycle 100 is in riding configuration 101, as illustrated in FIG. 1A, without limiting the scope of the invention. It should also be appreciated that any locking mechanism employed to lock the hinges is capable of being unlocked to allow the hinges to pivot about their respective pivot axes.

Figure 2:
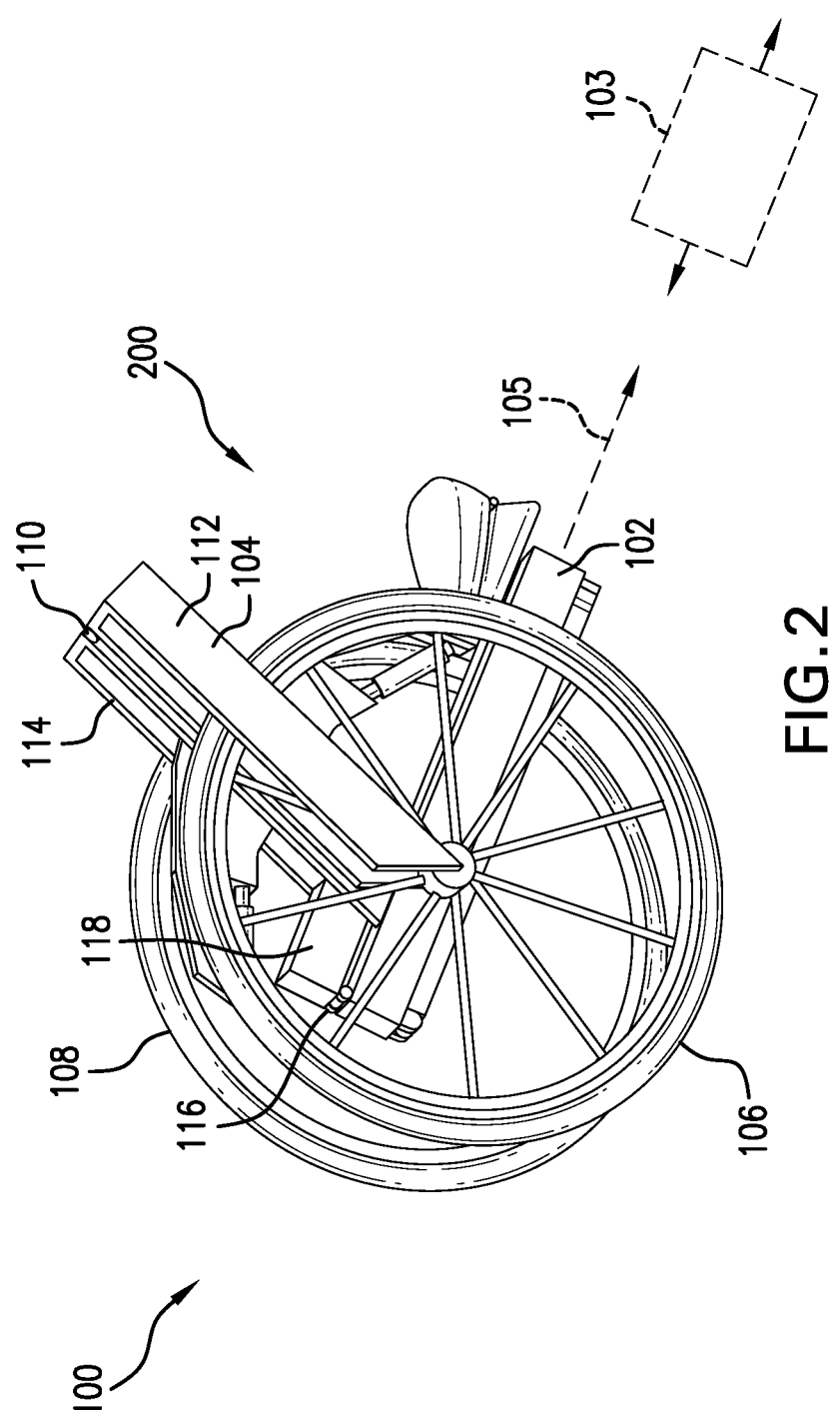
FIG. 2 illustrates a left side view of the folding bicycle of FIG. 1A in a collapsed and/or storage configuration according to an embodiment of the invention.
Figure 3:
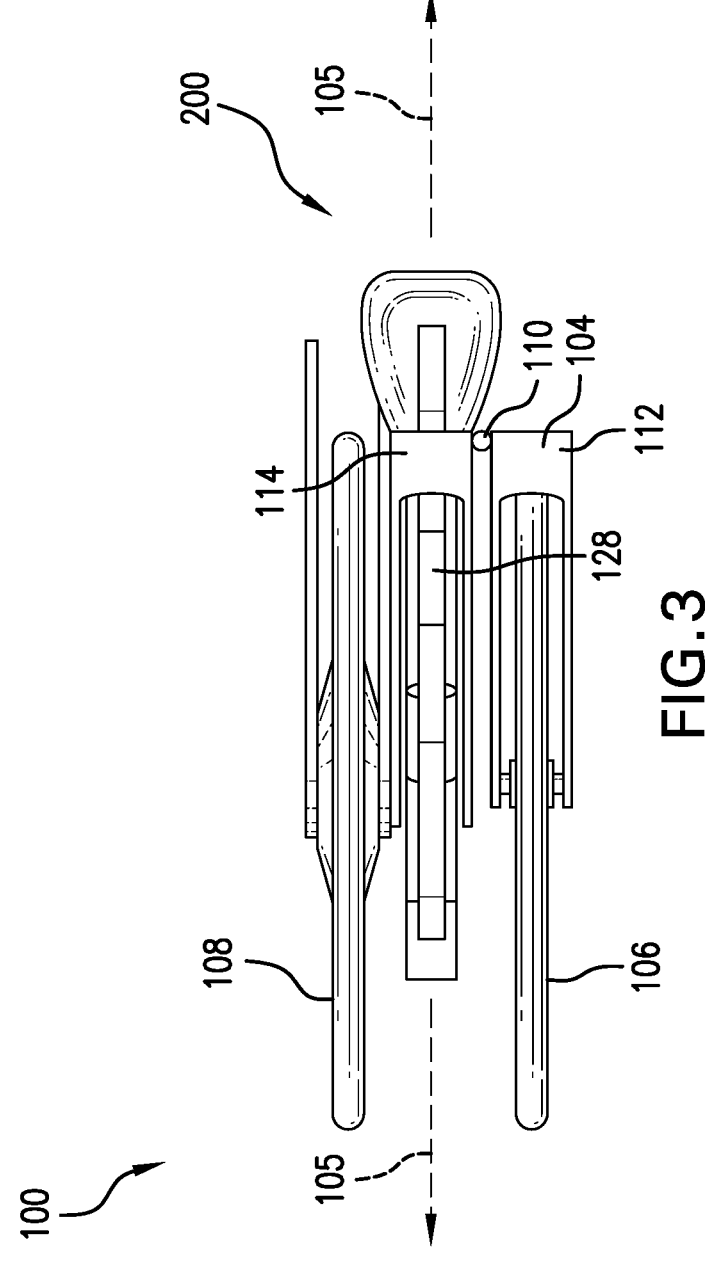
FIG. 3 illustrates a top view of the folding bicycle of FIG. 1A in a collapsed and/or storage configuration according to an embodiment of the invention.

Referring to FIGS. 2 and 3, folding bicycle 100 is illustrated in fully folded, collapsed or storage configuration 200. Specifically, FIGS. 2 and 3 provide a side view and a top view, respectively, of folding bicycle 100 in its completely folded state. When wheel 106 is folded at hinge 110, wheel 106 becomes aligned with the left side of fork 104. When the front end 118 of frame 102 is folded at hinge 116, front wheel 106 is moved so that it is along the left side of frame 102. When wheel 108 is folded at hinge 122 (FIG. 1A), it becomes aligned with the right side of frame 102. While it has been described that when folding bicycle 100 is in collapsed or storage configuration 200, wheel 106 is aligned with the left side of fork 104 and wheel 108 is aligned with the right side of frame 102, it should be appreciated that wheels 106 and 108 may be aligned on either side of folding bicycle 100, without limiting the scope of the invention. Notably, it should be understood that when folding bicycle 100 is in configuration 200, wheels 106 and 108 are folded on opposite sides of folding bicycle 100.

Figure 4A:
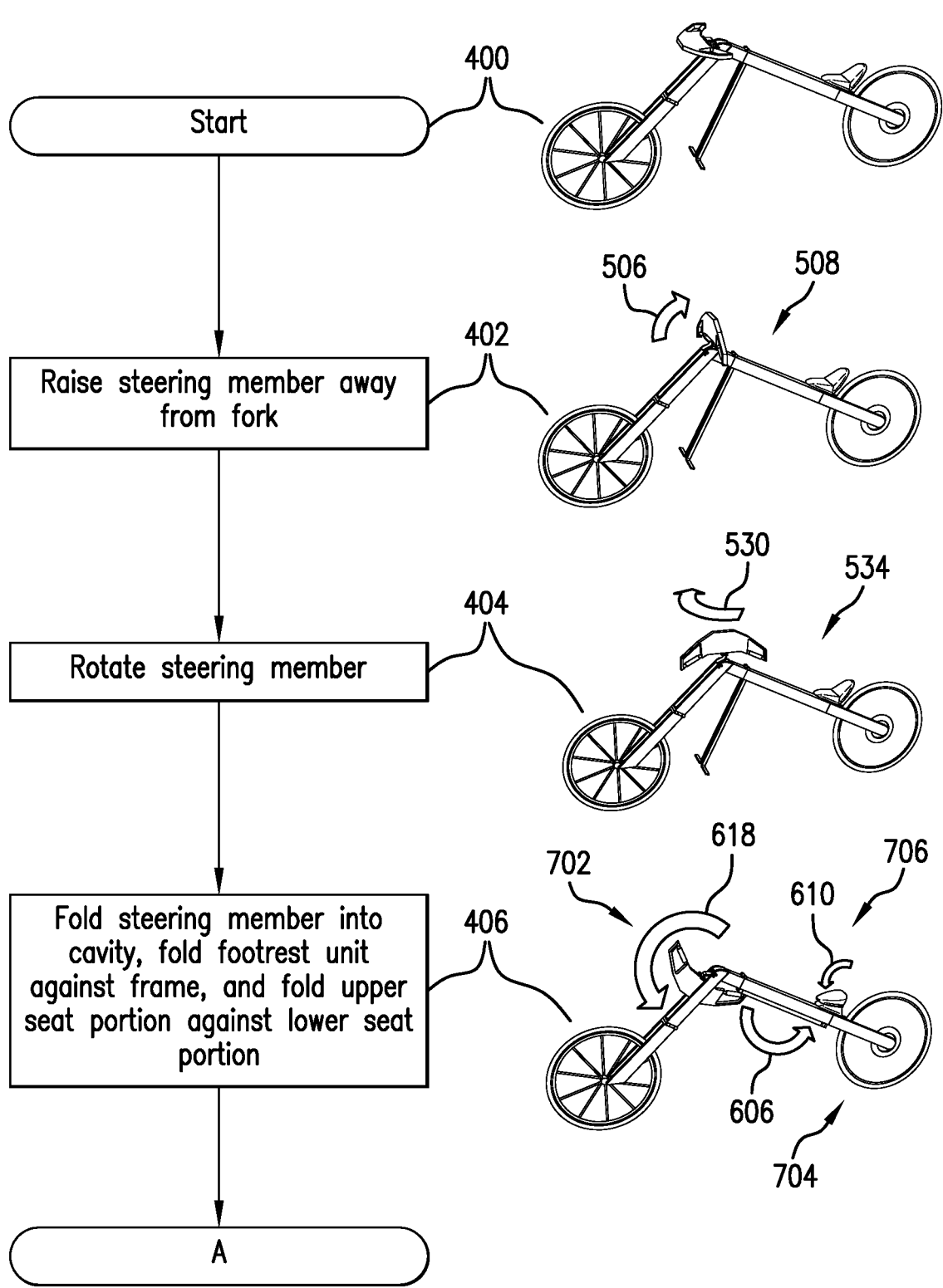
FIGS. 4A-B is a flow diagram illustrating the method of folding the bicycle of FIGS. 1A-3 from the riding configuration of FIG. 1A to the collapsed and/or storage configuration of FIGS. 2 and 3 and corresponding images according to an embodiment of the invention.
Figure 4B:
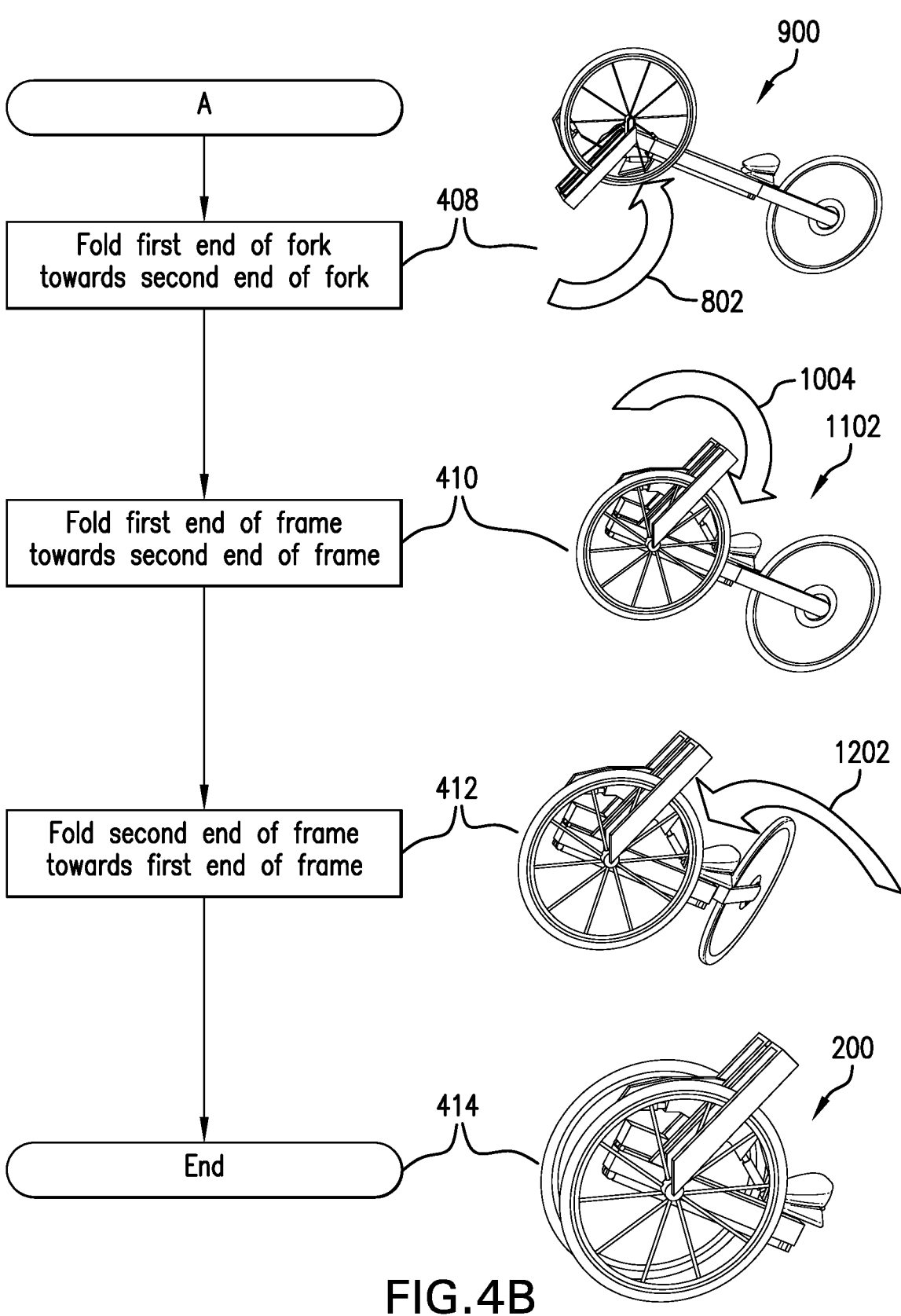

FIGS. 4A-4B depict a flow diagram illustrating a preferred method for folding bicycle 100 of FIGS. 1A-3 and 5A-12 from riding configuration 101 of FIG. 1A to collapsed and/or storage configuration 200 of FIGS. 2-3 according to an embodiment of the invention. The method starts at step 400 where folding bicycle 100 is in riding configuration 101 and where fork 104 and plane 109 are aligned in parallel with frame 102 and plane 103. In step 402, locking mechanism 160 is first unlocked, in the manner described above, thereby releasing secondary pivot member 130 from its locked position and subsequently allowing handlebar 128 to pivot about pivot axis 504. After locking mechanism 160 is unlocked, fork locking mechanism 515 is locked, in the manner described above, to prevent fork 104 from rotating about steering column 141, thereby allowing a user to more easily fold folding bicycle 100. After unlocking locking mechanism 160 and locking fork locking mechanism 515, steering member 128, via secondary pivot member 130, is tilted or pivoted in direction 506 about 90 degrees about pivot axis 504, thereby forming folded configuration 508. In step 404, steering member 128, via swivel mount 550, is rotated in direction 530 about 90 degrees about pivot axis 532 until steering member 128 is substantially parallel to plane 109 of fork 104, thereby forming folded configuration 534.

Next, in step 406, steering member 128 is folded in direction 618 toward fork 104, about pivot axis 504 until steering member 128 is at least partially disposed within cavity 502, thereby forming folded configuration 702. Moreover, in step 406, secondary pivot member 142 is released from its locked position and footrest unit 135 is folded in direction 606 toward frame 102, about pivot axis 604, until footrest unit 135 abuts underside 602 of frame 102, thereby forming folded configuration 704. It is contemplated that footrest unit 135 may be clipped using a retaining member (not shown) or clip (not shown) to underside 602 of frame 102 to securely retain footrest unit 135 against frame 102. Finally, in step 406, secondary pivot member 150 is released from its locked position and upper seat portion 146 is folded in direction 610 toward lower seat portion 148, about pivot axis 614, until upper seat portion 146 abuts lower seat portion 148, thereby forming folded configuration 706. It is further contemplated that upper seat portion 146 may be securely retained to lower seat portion 148 using any known method or components. Additionally, it should be appreciated that secondary pivot members 142 and 150 may be locked using any commonly known method or implementation and, particularly, by using a locking pin as described above with respect to locking mechanism 160, without limiting the scope of the present invention.

In step 408 primary pivot member 110 is released from its locked position and first end 112 of fork 104 is folded in direction 802 towards second end 114 of fork 104 about 180 degrees about pivot axis 111 until first end 112 is substantially parallel to second end 114, planes 103 and 109, and axes 105 and 107, thereby forming folded configuration 900. Next, in step 410, primary pivot member 116 is released from its locked position and first end 118 of frame 102 is folded in direction 1004 towards second end 124 of frame 102 about 180 degrees about pivot axis 117 until first end 118 is substantially parallel to frame 102 and axis 105. Folded configuration 900 remains substantially parallel to plane 103, thereby forming folded configuration 1102. In step 412, primary pivot member 122 is released from its locked position and second end 124 of frame 102 is folded in direction 1202 towards first end 118 of frame 102 about 180 degrees about pivot axis 123 until second end 124 and consequently wheel 108 are substantially parallel to frame 102, planes 103 and 109, axes 105 and 107, wheel 106, and folded configuration 1102, thereby forming folded configuration or collapsed configuration 200. It is contemplated that any known method or components may be implemented to securely retain folding bicycle 100 in collapsed configuration 200, without limiting the scope of the invention. The method ends at step 414.

Further details of folding bicycle 100 are set forth in FIGS. 5A-12. Turning now to FIGS. 5A-7, steering unit 125 of folding bicycle 100 is illustrated. Steering unit 125 preferably comprises at least two pivot members to allow it to be folded into a cavity 502 formed in fork 104. Specifically, as illustrated in FIGS. 5A-6, steering unit 125 preferably comprises coupling member 126 having a first end 156 and a second end 132, a plate 155 molded or welded to first end 156, a secondary pivot member or swivel mount 550 (FIG. 1E) adapted to preferably pivotally mount steering member 128 to plate 155, and a secondary pivot member or axle 130 adapted to preferably pivotally connect second end 132 of coupling member 126 to second end 114 of fork 104. Turning briefly to FIG. 1E, secondary pivot member or swivel mount 550 preferably comprises a pivot axis 532 substantially parallel to plane 109 and substantially perpendicular to plate 155 to allow steering member 128 to rotate about pivot axis 532 and relative to coupling member 126. Referring back to FIG. 5A, secondary pivot member 130 preferably comprises a pivot axis 504 substantially perpendicular to plane 109 and substantially perpendicular to axis 107 to allow steering member 128 to pivot about pivot axis 504 and relative to fork 104, after secondary pivot member 130 is released from its locked position. In particular, secondary pivot member 130 is preferably adapted to allow steering member 128, via coupling member 126, to pivot about pivot axis 504 in a direction 506 away from fork 104 and in a direction 618 (FIG. 1F) towards fork 104. To fold steering unit 125 into configuration 702 after secondary pivot member 130 has been released from its locked position, steering member 128 is preferably (i) pivoted in a direction 506 away from fork 104 to form folded configuration 508; (ii) pivoted or rotated in a direction 530 until steering member 128 is substantially parallel to fork 104 to form folded configuration 534; and (iii) pivoted in a direction 618 towards fork 104 until steering member 128 is at least partially disposed within a cavity 502 provided in fork 104.

Figure 7:
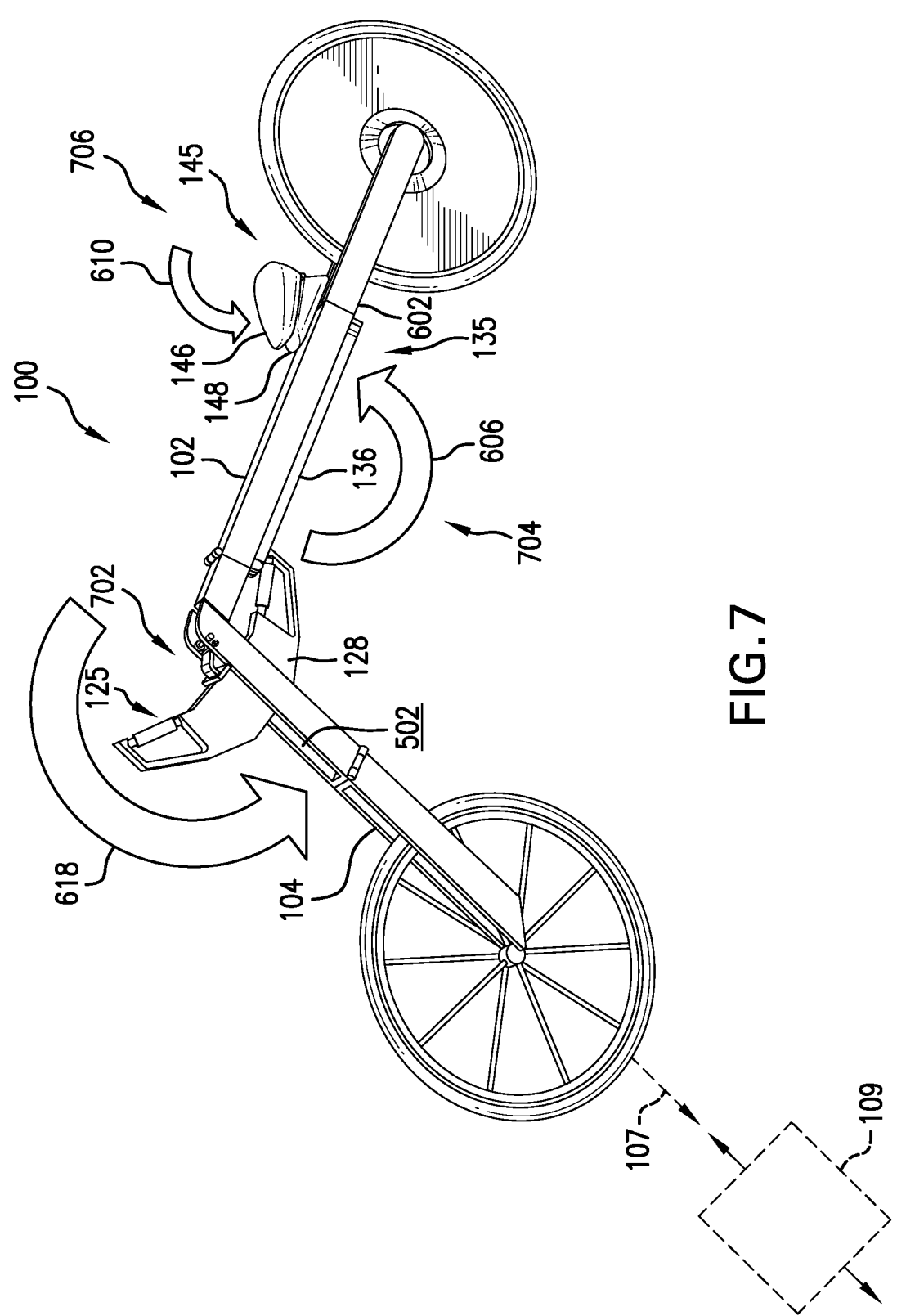
FIG. 7 illustrates a left side view of the folding bicycle of FIG. 1A in a first folded position according to an embodiment of the invention.

Referring back to 1F, to fold footrest unit 135 into folded configuration 704 (FIG. 7), secondary pivot member 142 is first unlocked and elongated member 136 is then pivoted in direction 606 until elongated member 136 abuts underside 602 of frame 102. Moreover, to fold seat unit 145 into folded configuration 706 (FIG. 7), secondary pivot member 150 is first unlocked and upper seat portion 146 is then pivoted in direction 610 until upper seat portion 146 abuts lower seat portion 148. It is also contemplated that when seat unit 145 is in the folded position as depicted in FIG. 7, it may be used as a handle or grip member, thereby allowing a user to conveniently carry folding bicycle 100.

Further details of the various folding operations described above are depicted in FIGS. 7-12. Referring to FIG. 7, each of the secondary folding components, i.e., steering unit 125, footrest unit 135, and seat unit 145 are in the folded configurations 702, 704, and 706, respectively, as discussed above with respect to FIGS. 5A-6. As illustrated, steering member 128 is rotated and folded in a direction 618 into cavity 502 of fork 104, elongated member 136 is folded in a direction 606 to frame 102, and upper seat portion 146 is folded in a direction 610 to lower seat portion 148. When folded into the storage or folded configurations 702, 704, and 706, steering member 128 is preferably aligned substantially parallel with fork 104, plane 109, and axis 107 and is disposed in cavity 502, elongated member 136 preferably abuts underside 602 of frame 102, where it may be held in place by a retaining member (not shown), and upper seat portion 146 preferably rests on top of lower seat portion 148, where it may be held in place by a retaining member (not shown).

Figure 8:
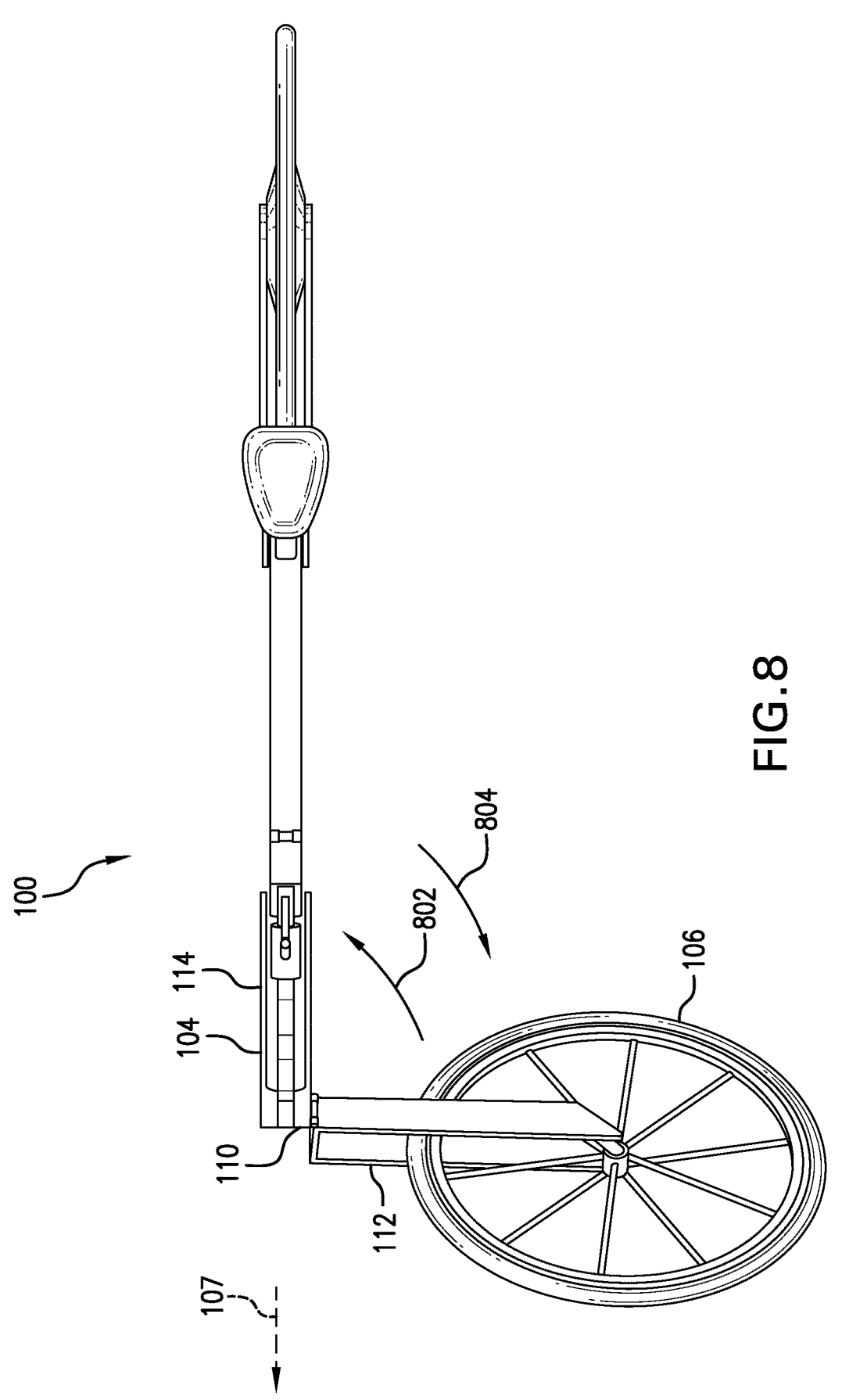
FIG. 8 illustrates a top view of the folding bicycle of FIG. 1A depicting a first primary fold of the folding bicycle in mid-fold position according to an embodiment of the invention.
Figure 9:
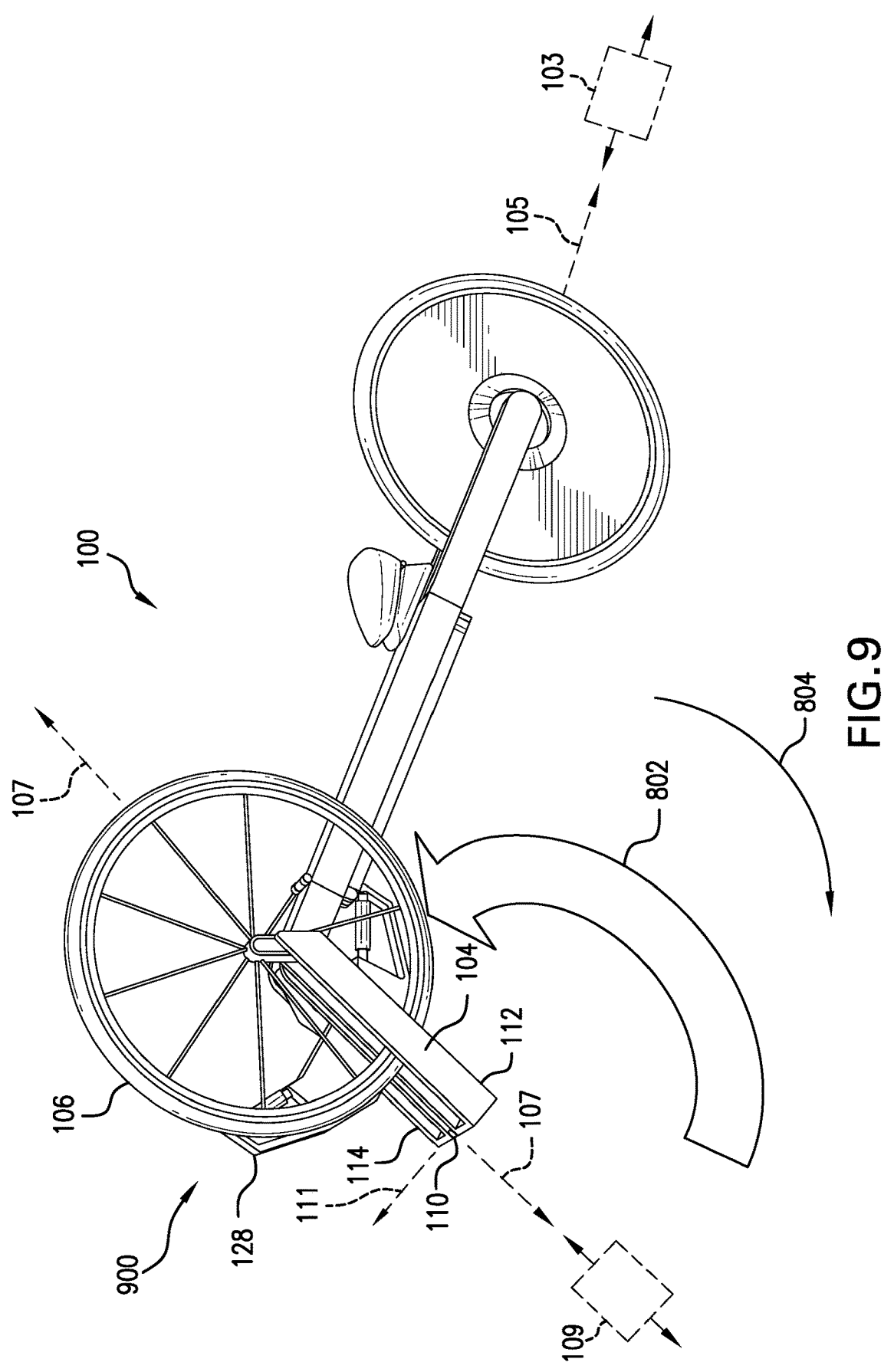
FIG. 9 illustrates a left side view of the folding bicycle of FIG. 1A in a second folded position according to an embodiment of the invention.

Turning now to FIGS. 8-9, the folding of fork 104 of folding bicycle 100 is illustrated. To complete this fold, first end 112 of fork 104 is pivoted towards second end 114 of fork 104 until first end 112 is substantially parallel to second end 114. Primary pivot member or hinge 110 having pivot axis 111 (FIG. 1A) pivotally connects first end 112 of fork 104 to second end 114 of fork 104. Generally, after primary pivot member or hinge 110 has been released from its locked position, first end 112 of fork 104 pivots about pivot axis 111 in a direction 802 toward second end 114 of fork 104 until first end 112 is substantially parallel to second end 114 plane 109, and axis 107.

Specifically, as illustrated in FIGS. 8-9, primary pivot member or hinge 110 is preferably provided about halfway down the length of fork 104 on the left side and is adapted to pivotally connect first end 112 of fork 104 to second end 114 of fork 104. Also provided is a locking mechanism (not shown) to releasably lock primary pivot member 110 in a rigid position. Locking mechanism may be unlocked to allow pivot member 110 to pivot about pivot axis 111. It should be understood that any commonly known or used locking mechanism may be incorporated, without limiting the scope of the invention. When folding bicycle 100 is in riding configuration 101 as illustrated in FIG. 1A, first end 112 and second end 114 of fork 104 extend along plane 109 and axis 107. Moreover, primary pivot member 110 comprises pivot axis 111 substantially parallel to plane 109 of fork 104 and substantially perpendicular to axis 107 of fork 104 to allow first end 112 of fork 104 to pivot in direction 802 towards second end 114, and about pivot axis 111, after primary pivot member 110 is released from its locked position. Primary pivot member 110 allows first end 112 to pivot in directions 802 and 804, towards and away from, respectively, second end 114, as illustrated in FIGS. 8-9.

Referring to FIG. 9, folding bicycle 100 is illustrated in yet another folded configuration 900. Specifically, folding bicycle 100 is in folded configuration 900, as discussed above with respect to FIG. 8. As illustrated in FIG. 9, first end 112 of fork 104 is folded in a direction 802 to second end 114 of fork 104. When folding bicycle 100 is folded into folded configuration 900, first end 112 of fork 104 is preferably aligned substantially parallel with second end portion 114 of fork 104, plane 109, and axis 107, where it may be held in place by a retaining member (not shown). In particular, primary pivot member 110 allows first end 112 of fork 104 to pivot towards second end 114 of fork 102 about 180 degrees about pivot axis 111 until first end 112 of fork 104 and consequently wheel 106 is substantially parallel to second end 114 of fork 104, plane 109, axis 107, and folded steering member 128, thereby forming folded configuration 900.

Figure 10:
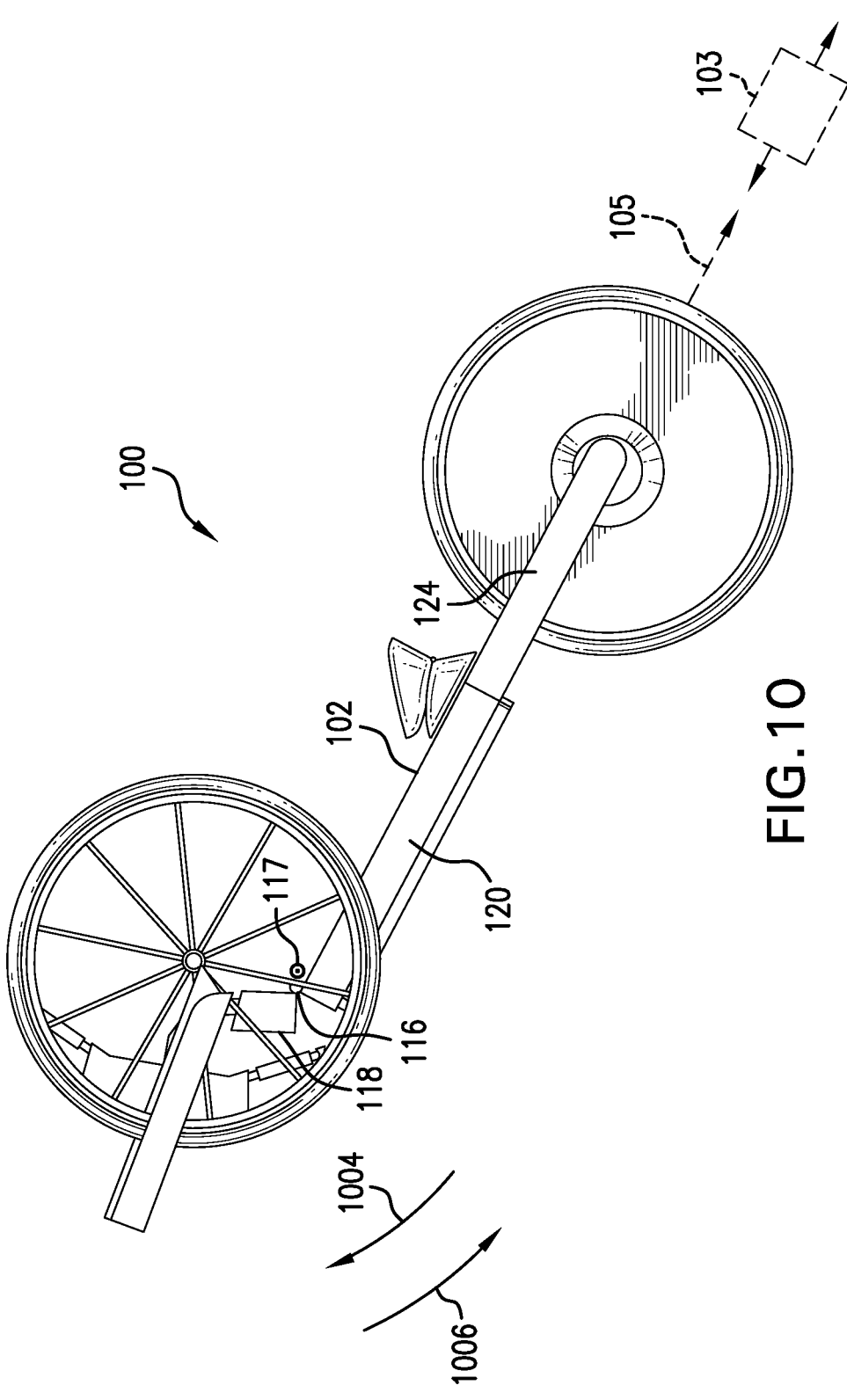
FIG. 10 illustrates a left side view of the folding bicycle of FIG. 1A depicting a second primary fold of the folding bicycle in mid-fold position according to an embodiment of the invention.
Figure 11:
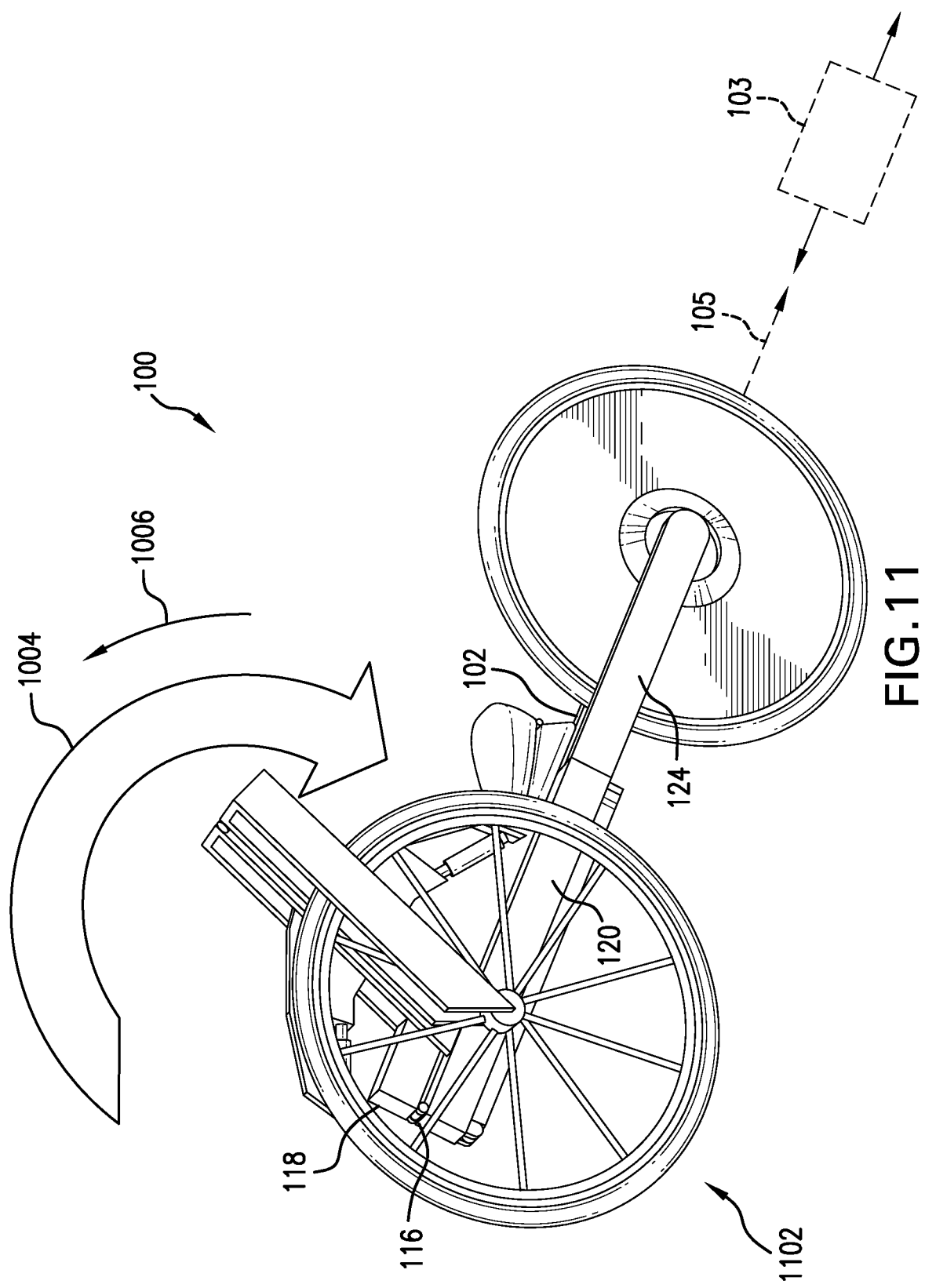
FIG. 11 illustrates a left side view of the folding bicycle of FIG. 1A in a third folded position according to an embodiment of the invention.

FIGS. 10-11 depict the folding of the front end 118 of frame 102 on itself. To do this, first end 118 of frame 102 is pivoted towards frame 102. Primary pivot member or hinge 116 having pivot axis 117 is provided to make this fold. Generally, after primary pivot member or hinge 116 has been released from its locked position, first end 118 of frame 102 is pivoted about pivot axis 117 in a direction 1004 toward middle portion 120 of frame 102 until first end 118 of frame 102 is substantially parallel to frame 102, plane 103, and axis 105.

Specifically, as illustrated in FIGS. 10-11, primary pivot member or hinge 116 is provided about an eighth to about a quarter of the way down the length of frame 102 on the top side and is adapted to pivotally connect first end 118 of frame 102 to middle portion 120 of frame 102. Also provided is a locking mechanism (not shown) to releasably lock primary pivot member 116 in a rigid position. Locking mechanism is unlocked to allow pivot member 116 to pivot about pivot axis 117. It should be understood that any commonly known or used locking mechanism may be incorporated, without limiting the scope of the invention.

When folding bicycle 100 is in riding configuration 101 as illustrated in FIG. 1A, first end 118 and middle portion 120 of frame 102 extend along plane 103 and axis 105. Moreover, primary pivot member 116 comprises pivot axis 117 substantially perpendicular to plane 103 and axis 105 of frame 102 to allow first end 118 of frame 102 to pivot in direction 1004 towards middle portion 120 or second end 124 of frame 102, and about pivot axis 117, after primary pivot member 116 is released from its locked position. Primary pivot member 116 allows first end 118 to pivot in directions 1004 and 1006, towards and away from, respectively, middle portion 120 and second end 124 of frame 102, as illustrated in FIGS. 10-11.

Referring to FIG. 11, folding bicycle 100 is illustrated at the completion of the folding of first end 118 of frame 102. First end 118 of frame 102 is folded in a direction 1004 to middle portion 120 and second end 124 of frame 102 causing the folded configuration 900 of FIG. 9 to pivot in direction 1004 towards second end 124 of frame 102 about 180 degrees about pivot axis 117. When the first end 118 of frame 102 is folded, as just described, folded configuration 1102 is formed. Specifically, first end 118 of frame 102 is aligned substantially parallel to middle portion 120, second end 124, and axis 105 of frame 102, while remaining substantially parallel to plane 103, where it may be held in place by a retaining member (not shown). In particular, primary pivot member 116 allows first end 118 of frame 102 and consequently wheel 106 to pivot towards middle portion 120 and second end 124 of frame 102 about 180 degrees about pivot axis 117 until first end 118 of frame 102 is substantially parallel to middle portion 120 of frame 102, second end 124 of frame 102, plane 103, and axis 105, and while wheel 106 remains substantially parallel to plane 103 and folded steering member 128, thereby forming folded configuration 1102.

Figure 12:
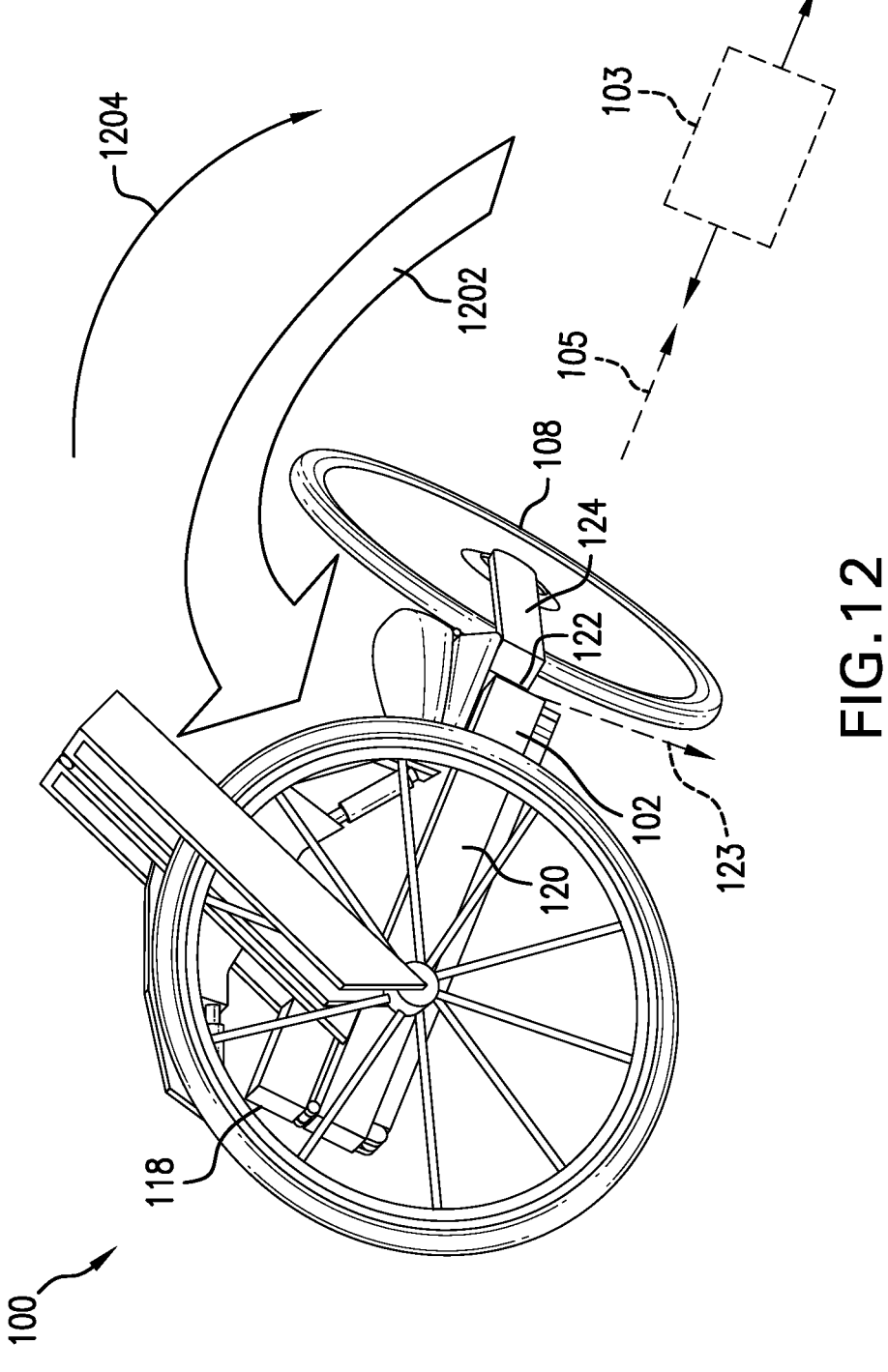
FIG. 12 illustrates a left side view of the folding bicycle of FIG. 1A depicting a third primary fold of the folding bicycle in mid-fold position according to an embodiment of the invention.

FIG. 12 depicts the folding of the rear wheel 108 against frame 102. To make this fold, second end 124 of frame 102 is pivoted towards frame 102. Primary pivot member or hinge 122 having pivot axis 123 is provided to complete this fold. Generally, after primary pivot member or hinge 122 has been released from its locked position, second end 124 of frame 102 pivots about pivot axis 123 in a direction 1202 toward middle portion 120 of frame 102 until second end 124 of frame 102 is substantially parallel to frame 102, plane 103, and axis 105.

Specifically, as illustrated in FIG. 12, primary pivot member or hinge 122 is provided about two thirds of the way down the length of frame 102 on the right side and is adapted to pivotally connect second end 124 of frame 102 to middle portion 120 of frame 102. Also provided is a locking mechanism (not shown) to releasably lock primary pivot member 122 in a rigid position. Locking mechanism may be unlocked to allow pivot member 122 to pivot about pivot axis 123. It should be understood that any commonly known or used locking mechanism may be incorporated, without limiting the scope of the invention. When folding bicycle 100 is in riding configuration 101 as illustrated in FIG. 1A, first end 118, middle portion 120, and second end 124 of frame 102 extend along plane 103 and axis 105. Moreover, primary pivot member 122 preferably comprises pivot axis 123 substantially parallel to plane 103 of frame 102 and substantially perpendicular to axis 105 of frame 102 to allow second end 124 of frame 102 to pivot in direction 1202 towards middle portion 120 or first end 118 of frame 102, about pivot axis 123, relative to frame 102, after primary pivot member 122 is released from its locked position, thereby forming collapsed or storage configuration 200

(FIGS. 2 and 3). Primary pivot member 122 preferably allows second end 124 to pivot in directions 1202 and 1204, towards and away from, respectively, middle portion 120 and first end 118 of frame 102, as illustrated in FIG. 12.

While hinge 110 has been described as being on the left side of fork 104 and hinge 122 on the right side of frame 102, it should be appreciated that hinge 110 could be mounted on the right side of fork 104 and hinge 122 on the left side of frame 102 so that wheels 106 and 108 are on the right and left sides, respectively, of frame 102 when folding bicycle 100 is folded.

Furthermore, it should be appreciated and understood that each pivot member disclosed and described throughout this specification may be any commonly known and used component or hinge that is capable of performing the desired pivoting action and achieving the desired result. As such, any known or used pivot member or hinge may be incorporated with folding bicycle 100 for any of the pivot members described above, without limiting the scope of the invention.

It should also be appreciated and understood that each component of folding bicycle 100 may constructed from any type of sturdy material commonly known or used in the art, such as, but not limited to, steel, titanium, and the like, without limiting the spirit of the invention.

It should also be understood that this invention is not limited to the disclosed features and other similar method and system may be utilized without departing from the spirit and the scope of the invention.

While the invention has been described with reference to the preferred embodiment and alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the invention is capable of being embodied in other forms without departing from its essential characteristics.

What is claimed is:

1. A bicycle comprising:
a frame comprising a frame member and a fork, wherein the frame member extends longitudinally along a first axis, from a first end to a second end, and wherein the fork extends longitudinally along a second axis and is pivotally connected to the terminal end of the second end of the frame member;
a rear wheel rotatably connected to the first end of the frame member;
a front wheel rotatably connected to the fork;
a seat connected to the frame member; and
a footrest connected to the frame;
wherein the fork comprises a first side wall and a second side wall;
wherein the frame does not include any frame elements extending along an axis other than the first axis or the second axis; and
wherein the footrest comprises a first elongated member and a flange.

2. The bicycle of claim 1, wherein the rear wheel and the frame member are located in a first plane.

3. The bicycle of claim 1, wherein the rear wheel is connected to the frame member at a first height, wherein the fork is connected to the frame at a second height, and wherein the second height is higher than the first height.

4. The bicycle of claim 3, wherein the angle between the frame member and the fork is approximately 90 degrees.

5. The bicycle of claim 1, wherein the angle between the frame member and the fork is approximately 90 degrees.

6. The bicycle of claim 1, wherein the first elongated member extends from a first end to a second end, wherein the first end of the first elongated member is connected to the frame, and wherein the flange is connected to the second end of the first elongated member.

7. The bicycle of claim 6, wherein the flange extends substantially perpendicular to the first elongated member.

8. A bicycle comprising:
a frame comprising a frame member and a fork, wherein the frame member extends longitudinally along a first axis, from a first end to a second end, and wherein the fork extends longitudinally along a second axis and is connected to the terminal end of the second end of the frame member;
a rear wheel rotatably connected to the first end of the frame member;
a front wheel rotatably connected to the fork;
a seat connected to the frame member; and
a footrest connected to the frame;
wherein the fork comprises a first side wall and a second side wall;
wherein the frame does not include any frame elements extending along an axis other than the first axis or the second axis; and
wherein the footrest is pivotally connected to the frame.

9. A bicycle comprising:
a frame comprising a frame member and a fork, wherein the frame member extends longitudinally along a first axis, from a first end to a second end, and wherein the fork extends longitudinally along a second axis and is connected to the second end of the frame member;
a rear wheel rotatably connected to the first end of the frame;
a front wheel rotatably connected to the fork; and
a seat connected to the frame and in direct contact with the frame; and
a footrest connected to the frame;
wherein the fork comprises a first side wall and a second side wall;
wherein the frame does not include any frame elements extending along an axis other than the first axis or the second axis; and
wherein the footrest comprises a first elongated member and a flange.

10. The bicycle of claim 9, wherein the rear wheel is connected to the frame member at a first height, wherein the fork is connected to the frame member at a second height, and wherein the second height is higher than the first height.

11. The bicycle of claim 10, wherein the angle between the frame member and the fork is approximately 90 degrees.

12. The bicycle of claim 9, wherein the angle between the frame member and the fork is approximately 90 degrees.

13. The bicycle of claim 1, wherein the first elongated member extends from a first end to a second end, wherein the first end of the first elongated member is connected to the frame member, and wherein the flange is connected to the second end of the first elongated member.

14. The bicycle of claim 13, wherein the flange extends substantially perpendicular to the first elongated member.

15. The bicycle of claim 9, wherein the footrest is pivotally connected to the frame.

* * * * *